US012112156B2

(12) United States Patent
Yamamoto et al.

(10) Patent No.: US 12,112,156 B2
(45) Date of Patent: Oct. 8, 2024

(54) SYSTEM, DEVICE AND MEDIUM FOR EVALUATING THE EFFECT OF A VEHICLE SOFTWARE UPDATE

(71) Applicant: TOYOTA JIDOSHA KABUSHIKI KAISHA, Toyota (JP)

(72) Inventors: Masafumi Yamamoto, Nagakute (JP); Atsushi Tabata, Okazaki (JP); Koichi Okuda, Toyota (JP); Yuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 17/662,750

(22) Filed: May 10, 2022

(65) Prior Publication Data

US 2023/0012315 A1  Jan. 12, 2023

(30) Foreign Application Priority Data

Jul. 7, 2021 (JP) .................................. 2021-112912

(51) Int. Cl.
*G06F 8/65* (2018.01)
*B60W 50/00* (2006.01)

(52) U.S. Cl.
CPC ....... *G06F 8/65* (2013.01); *B60W 2050/0075* (2013.01); *B60W 2556/45* (2020.02)

(58) Field of Classification Search
CPC ............. G06F 8/60–66; G06F 11/1433; G06F 11/36–3696; G06F 11/34–3495; B60W 2556/45; B60W 2050/0075
See application file for complete search history.

(56) References Cited

U.S. PATENT DOCUMENTS

| 10,732,959 | B2* | 8/2020 | Jayaraman | .......... H04L 41/0853 |
| 10,884,902 | B2* | 1/2021 | Kislovskiy | .......... G06F 11/0706 |
| 10,938,656 | B2* | 3/2021 | McGrath | ............ G05B 19/0426 |
| 2008/0271025 | A1* | 10/2008 | Gross | .................... G06F 21/577 |
| | | | | 718/102 |
| 2013/0055228 | A1* | 2/2013 | Song | ...................... G06F 8/654 |
| | | | | 717/168 |
| 2018/0341571 | A1* | 11/2018 | Kislovskiy | .......... G06F 11/0778 |
| 2019/0132204 | A1* | 5/2019 | McGrath | ............ H04L 41/0654 |

(Continued)

FOREIGN PATENT DOCUMENTS

| JP | 2003-34200 A | 2/2003 |
| JP | 2020-13557 A | 1/2020 |
| WO | WO 2020/194186 A1 | 10/2020 |

*Primary Examiner* — Todd Aguilera
(74) *Attorney, Agent, or Firm* — Oblon, McClelland, Maier & Neustadt, L.L.P.

(57) ABSTRACT

A software update system according to one embodiment of the present disclosure is configured to update software used in a vehicle based on update data of the software, the update data being transmitted to the vehicle from an external device that is communicably connected to the vehicle. The software update system includes: a software update unit configured to update the software based on the update data; a vehicle data acquisition unit configured to acquire respective pieces of second vehicle data about states of the vehicle before and after the software update by the update unit; and an effect evaluation unit configured to evaluate an effect of the software update based on the respective pieces of second vehicle data before and after the software update.

15 Claims, 14 Drawing Sheets

(56) References Cited

U.S. PATENT DOCUMENTS

| | | |
|---|---|---|
| 2019/0384870 A1 | 12/2019 | Shiraishi et al. |
| 2020/0125349 A1* | 4/2020 | Jayaraman .............. G07C 5/008 |
| 2021/0294578 A1* | 9/2021 | Noguchi ............... B60W 50/00 |

* cited by examiner

SYSTEM, DEVICE AND MEDIUM FOR EVALUATING THE EFFECT OF A VEHICLE SOFTWARE UPDATE

CROSS-REFERENCE TO RELATED APPLICATION

This application claims priority to Japanese Patent Application No. 2021-112912 filed on Jul. 7, 2021, incorporated herein by reference in its entirety.

BACKGROUND

1. Technical Field

The present disclosure relates to an information processing system and the like.

2. Description of Related Art

For example, there is known a technique of transmitting software (for example, programs, data such as parameters used for the programs, etc.) used in a vehicle to the vehicle from an external device to perform update of the software (see Japanese Unexamined Patent Application Publication No. 2003-34200 (JP 2003-34200 A)).

In JP 2003-34200 A, an evaluation simulator is used to evaluate the operation of the vehicle before and after software update, and the software update is performed after it is confirmed that the software update corrects the function of the vehicle in a desired direction.

SUMMARY

However, according to the above technique, the prior confirmation is performed only before software update. Accordingly, when the update of the software used in the vehicle is actually performed, it is not clear whether a desired effect can be obtained in the vehicle. Therefore, from the viewpoint of, for example, serviceability in terms of future vehicle maintenance, inspection, and the like, as well as feedback to future vehicle development and the like, it is desirable to evaluate the effect of updating the software used in the vehicle when the software update is actually performed.

In light of the above issue, it is an object of the present disclosure to provide a technique that allows, when the update of software used in a vehicle is actually performed, evaluation of the effect of the update in the vehicle.

In order to accomplish the object, an embodiment of the present disclosure provides an information processing system configured to update software used in a vehicle based on update data of the software, the update data being transmitted to the vehicle from an external device that is communicably connected to the vehicle. The information processing system includes an update unit; an acquisition unit; and an evaluation unit. The update unit is configured to update the software based on the update data. The acquisition unit is configured to acquire respective pieces of predetermined data about states of the vehicle before and after the software update by the update unit. The evaluation unit is configured to evaluate an effect of the software update based on the respective pieces of predetermined data before and after the software update.

Another embodiment of the present disclosure provides an information processing device configured to update software used in a vehicle based on update data of the software, the update data being transmitted to the vehicle from an external device that is communicably connected to the vehicle. The information processing device includes: an update unit; an acquisition unit; and an evaluation unit. The update unit is configured to update the software based on the update data. The acquisition unit is configured to acquire respective pieces of predetermined data about states of the vehicle before and after the software update by the update unit. The evaluation unit is configured to evaluate an effect of the software update based on the respective pieces of predetermined data before and after the software update.

Still another embodiment of the present disclosure provides an information processing method executed by an information processing device configured to update software used in a vehicle based on update data of the software, the update data being transmitted to the vehicle from an external device that is communicably connected to the vehicle. The information processing method includes: an update step of updating the software based on the update data; an acquisition step of acquiring respective pieces of predetermined data about states of the vehicle before and after the software update in the update step; and an evaluation step of evaluating an effect of the software update based on the respective pieces of predetermined data before and after the software update.

Yet another embodiment of the present disclosure provides a computer-readable recording medium that records a program for causing an information processing device to execute steps, the information processing device being configured to update software used in a vehicle based on update data of the software, the update data being transmitted to the vehicle from an external device that is communicably connected to the vehicle. The steps include: an update step of updating the software based on the update data; an acquisition step of acquiring respective pieces of predetermined data about states of the vehicle before and after the software update in the update step; and an evaluation step of evaluating an effect of the software update based on the respective pieces of predetermined data before and after the software update.

According to the embodiments, when update of software used in a vehicle is actually performed, it is possible to evaluate the effect of the software update in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described with reference to the drawings.

Outline of Software Update System

Figure 1:
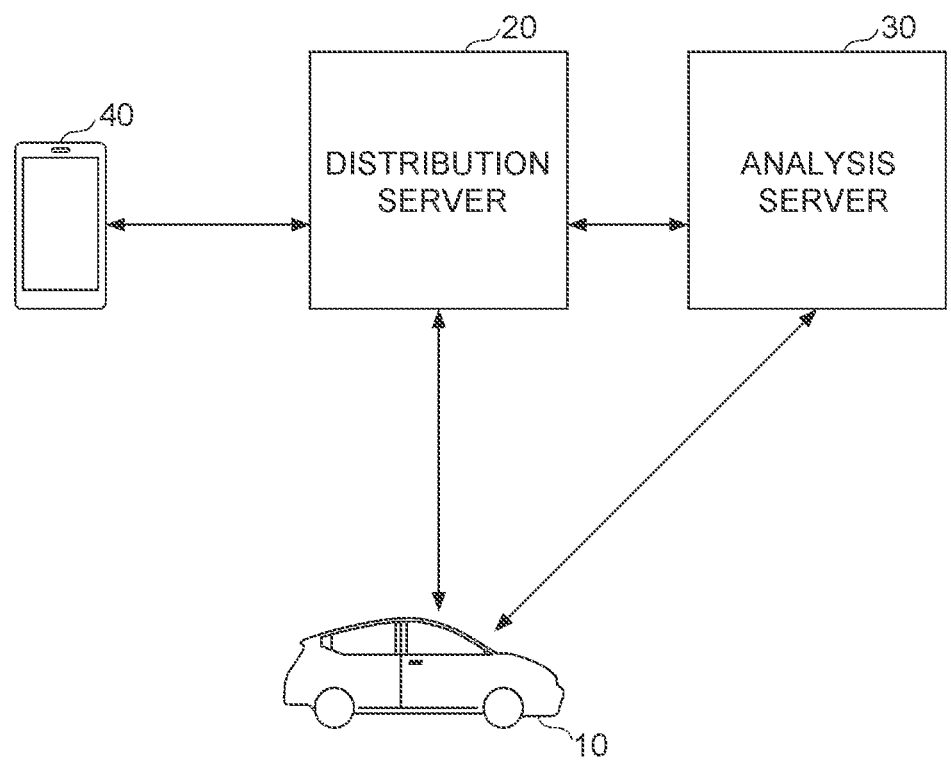
FIG. 1 is a schematic view showing an example of a software update system.

With reference to FIG. 1, the outline of a software update system 1 according to the present embodiment will be described.

FIG. 1 is a schematic view showing an example of the software update system 1.

As shown in FIG. 1, the software update system 1 (an example of an information processing system) includes a vehicle 10, a distribution server 20, an analysis server 30, and a user terminal 40.

The software update system 1 distributes update data of software used in the vehicle 10 to the vehicle 10, and allows update of software of the vehicle 10.

The software of the vehicle 10 includes, for example, programs that are executed on computers (in-vehicle computers) mounted on the vehicle 10, such as a gateway electronic control unit (ECU) 12, an ECU 13, and a central ECU 19 as will be described later. The software of the vehicle 10 includes various data, such as parameters used in processing by the programs that are executed on the in-vehicle computers, for example.

The software update system 1 also evaluates (confirms) the effect of the software update. This allows the software update system 1 to feed back the results of evaluating the effect of the software update to the development department of a current vehicle type corresponding to the vehicle 10 or its successor vehicle type, as well as to a service and inspection department of the current vehicle type.

The effect of the software update includes, for example, the effect relating to enhancement (improvement) of performance that corresponds to the purpose of the software update.

The effect of the software update also includes, for example, the effect relating to whether the state of the vehicle 10 is implemented according to the content of the software update (update data). For example, when a shifting condition (shift line) of the transmission of the vehicle 10 is updated (see FIG. 5 described later), implementing the state of the vehicle 10 according to the content of the software update means that shifting in the transmission is actually performed in accordance with the updated shifting condition. For example, when a switching map of motors (engine and motor generator) of the vehicle 10 is updated (see FIG. 6 described later), implementing the state of the vehicle 10 according to the content of the software update means that switching of the motors is actually performed in accordance with an updated switching condition. For example, when a control logic relating to shift change in the transmission of the vehicle 10 is updated (see FIGS. 7 to 9 described later), implementing the state of the vehicle 10 according to the content of the software update means that shifting in the transmission is performed in accordance with the updated control logic.

The vehicle 10 is a software update target. For example, the vehicle 10 travels with motive power transmitted from a given motor, such as an engine or a motor generator, to a drive wheel through a drive system such as a transmission, a differential, and a drive shaft.

The vehicle 10 is mounted with a communication device 11 as will be described later. The vehicle 10 is communicably connected to external devices, such as the distribution server 20 and the analysis server 30, via a predetermined communication line, for example. This enables the vehicle 10 to transmit information signals to the distribution server 20 or the analysis server 30, and to receive control signals and information signals (e.g., software update data) from the distribution server 20 or the analysis server 30.

The predetermined communication line includes, for example, a mobile communication network that is terminated by a base station, a satellite communication network that uses communication satellites, and a wide area network (WAN) such as the Internet network. The predetermined communication line may also include, for example, a local network (a local area network (LAN)) of a facility where the distribution server 20 or the analysis server 30 is installed. The predetermined communication line may also include, for example, a short-range communication line based on wireless communication standards such as WiFi and Bluetooth (registered trademark). The same may also apply to a communication line used for communication between the distribution server 20 and the analysis server 30, a communication line used for communication between the distribution server 20 and the user terminal 40, and other communication lines.

The software update system 1 may include one or more vehicles 10. In the latter case, the software update system 1 may include the vehicles 10 of the same vehicle type or the vehicles 10 of two or more vehicle types.

The distribution server 20 (an example of the external device) distributes various data used in the vehicle 10 to the vehicle 10. Specifically, the distribution server 20 distributes software update data to the vehicle 10.

For example, the distribution server 20 is an on-premise server or a cloud server installed in a monitoring center or the like that provides centralized monitoring of the states of the vehicles 10. For example, the distribution server 20 may also be an edge server installed in an area where the vehicles 10 mainly travel (for example, the area where the vehicles 10 are legally registered). In this case, two or more distribution servers 20 may be provided for all the vehicles 10 included in the software update system 1. The same may apply to the analysis server 30.

As described above, the distribution server 20 is communicably connected to the vehicle 10 via the predetermined communication line. This allows the distribution server 20 to receive various information signals from the vehicle 10 and to transmit various information signals (e.g., software update data) and control signals (e.g., software update commands) to the vehicle 10.

The analysis server 30 acquires, for example, various data (hereinafter "vehicle data") representing the state of the vehicle 10 from the vehicle 10 and performs analysis on the vehicle 10. Specifically, the analysis server 30 analyzes an effect obtained by updating the software of the vehicle 10.

As described above, the analysis server 30 is communicably connected to the vehicle 10 via the predetermined communication line. This allows the analysis server 30 to receive various information signals (e.g., vehicle data) from the vehicle 10 and to transmit various information signals or control signals to the vehicle 10.

The analysis server 30 is communicably connected to the distribution server 20 or the user terminal 40 via the predetermined communication line. This enables the analysis server 30 to transmit various information signals and control signals to the distribution server 20 or the user terminal 40, and to receive various information signals and control signals from the distribution server 20 or the user terminal 40.

Note that the functions of the distribution server 20 and the analysis server 30 may be collected into the distribution server 20 (an example of an information processing device) or the analysis server 30 (an example of the information processing device). The functions of the distribution server 20 and the analysis server 30 may be implemented by distributing the functions over three or more servers.

The user terminal 40 is a terminal device that is used (possessed) by the user of the vehicle 10. For example, the user of the vehicle 10 is the owner of the vehicle 10 or a family member of the owner of the vehicle 10. The user terminal 40 is a mobile (portable) terminal device, such as a smartphone, a tablet terminal, or a laptop-style personal computer (PC). The user terminal 40 may also be a stationary terminal device such as a desktop-style PC, for example.

As described above, the user terminal 40 is communicably connected to the distribution server 20 via the predetermined communication line. This enables the user terminal 40 to receive control signals and information signals transmitted from the distribution server 20, and to make the user of the vehicle 10 notice the information included in the signals through a display or a speaker. In response to an input from the user, the user terminal 40 can also transmit control signals and information signals appropriate to the content of the input to the distribution server so as to inform the request of the user corresponding to the content of the input made by the user to the distribution server 20.

Hardware Configuration of Software Update System

Now, with reference to FIGS. 2 and 3 in addition to FIG. 1, the hardware configuration of the software update system 1 will be described.

Hardware Configuration of Vehicle

Figure 2:
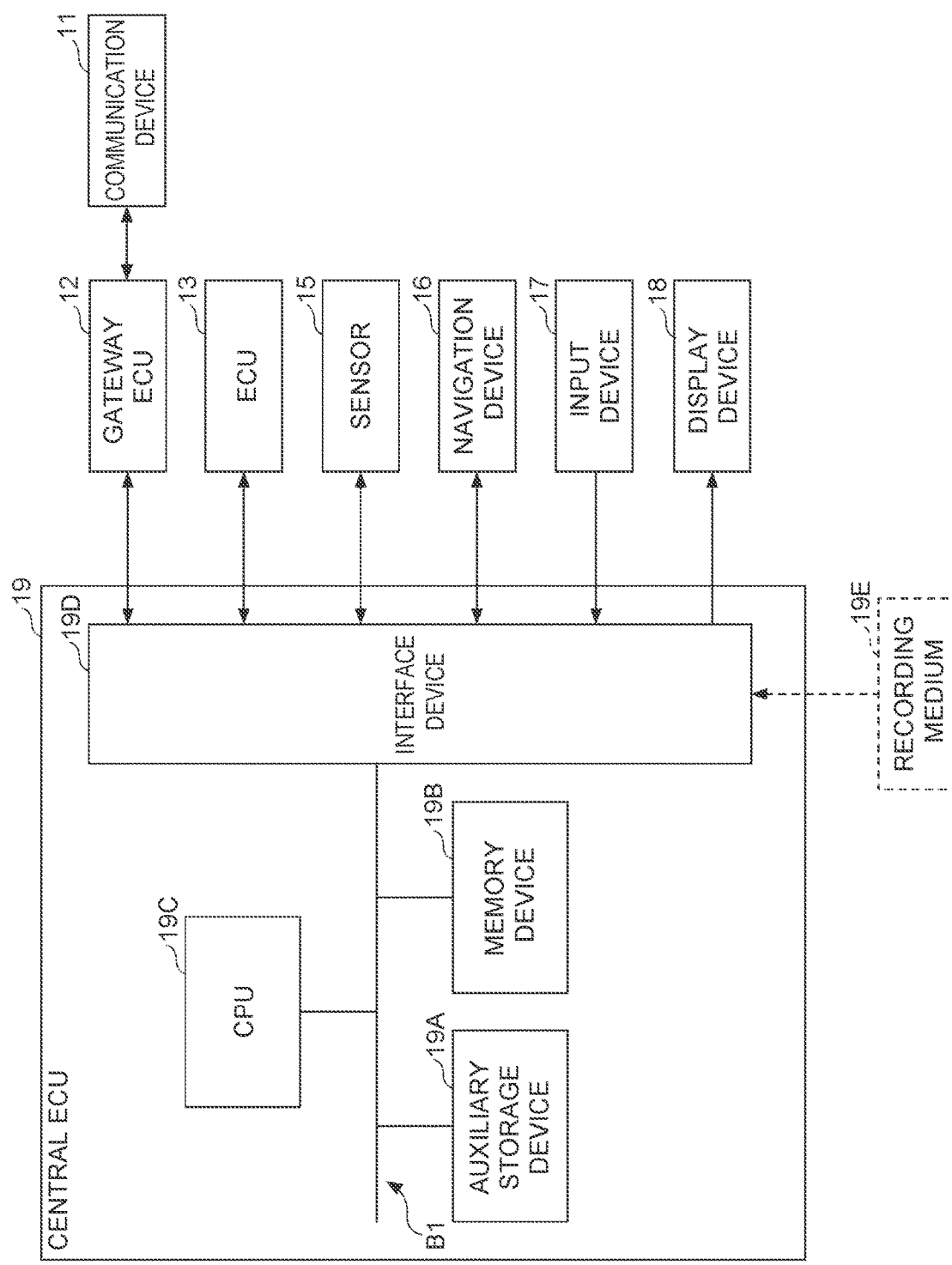
FIG. 2 shows an example of the hardware configuration of a vehicle.

FIG. 2 shows an example of the hardware configuration of the vehicle 10.

As shown in FIG. 2, the vehicle 10 includes the communication device 11, the gateway ECU 12, the ECU 13, a sensor 15, a navigation device 16, an input device 17, a display device 18, and the central ECU 19.

The communication device 11 communicates with the outside of the vehicle 10 through a predetermined communication line. For example, the communication device 11 is a mobile communication module capable of connecting to a mobile network that is terminated by a base station to communicate with the outside. Specifically, the communication device 11 may be a data communication module (DCM). The communication device 11 is communicably connected to the gateway ECU 12, the ECU 13, the central ECU 19, and the like, via a communication line inside the vehicle 10. For example, the communication line inside the vehicle 10 is a one-to-one communication line or an in-vehicle network. Examples of the in-vehicle network include a controller area network (CAN), a local interconnect network (LIN), FlexRay, and an in-vehicle Ethernet. The communication device 11 may transmit given signals to the outside in response to commands (requests) from the gateway ECU 12, for example. The signals received by the communication device 11 from the outside are also taken into the gateway ECU 12.

The gateway ECU 12 functions as a gateway between the communication line outside the vehicle 10 and the communication line inside the vehicle 10 (e.g., in-vehicle network).

The functions of the gateway ECU 12 may be implemented by any hardware, or by a combination of any hardware and software. For example, the gateway ECU 12 may have a hardware configuration similar to that of the central ECU 19 as will be described later. The gateway ECU 12 may implement various functions by loading programs installed on an auxiliary storage device into a memory device and executing the programs on a central processing unit (CPU). The same may also apply to the ECU 13.

For example, the gateway ECU 12 uses a known method to authenticate that the signal received by the communication device 11 from the outside is a signal that is transmitted from a regular transmission source and that is untampered. The regular transmission source means a transmission source that is registered as a transmission source in advance (e.g., distribution server 20, analysis server 30, etc.), or a transmission source that is authenticated in advance through mutual communication. The gateway ECU 12 transmits only the data of a successfully authenticated signal, among the signals received by the communication device 11, to predetermined in-vehicle devices (e.g., ECU 13, central ECU 19, etc.) via the communication line inside the vehicle 10.

For example, the gateway ECU 12 generates signals including the contents such as predetermined information and commands (requests), as requested by various devices of the vehicle 10, and transmits the signals through the communication device 11 to given destinations (e.g., distribution server 20 or analysis server 30).

One or more ECUs 13 are mounted on the vehicle 10. The ECUs 13 perform control relating to various functions of the vehicle 10. For example, the ECUs 13 include the ECU 13 that controls an engine as a motive power source of the vehicle 10, the ECU 13 that controls a motor generator (MG) as a motive power source of the vehicle 10, and the ECU 13 that controls a shift position of the transmission of the vehicle 10.

One or more sensors 15 are mounted on the vehicle 10. The sensor or sensors 15 output measurement data on the state of the vehicle 10. Output (measured data) from the sensor 15 is taken into the central ECU 19 via the communication line inside the vehicle 10. For example, the sensors 15 include the sensor 15 (wheel speed sensor) that measures wheel speed of each wheel of the vehicle 10. For example, the sensors 15 also include the sensors 15 (acceleration sensors) that measure longitudinal acceleration, lateral acceleration, and vertical acceleration of the vehicle 10. For example, the sensors 15 also include the sensors 15 (temperature sensors) that measure the temperature at given locations of the vehicle 10. Examples of the temperature sensors include temperature sensors that measure the temperature of a battery for driving or batteries for auxiliary machines mounted on the vehicle 10, coolant temperature sensors that measure the temperature of coolant for various devices, and oil temperature sensors that measure the temperature of lubricants in various devices. Examples of the sensors 15 also include a sensor 15 (global navigation satellite system (GNSS) sensor) that measures the position of the vehicle 10.

The navigation device 16 provides a route for the vehicle 10 to travel to a user (driver) of the vehicle 10 through the display device 18. For example, the navigation device 16 provides the route for the vehicle 10 to travel to the user of the vehicle 10 under the control of one ECU 13 out of the ECUs 13.

The input device 17 is provided in the cabin of the vehicle 10 and accepts various inputs from occupants. The input device 17 includes an operation input device, such as buttons, toggles, levers, a touch panel, or a touch pad, which accept operation inputs from the occupants, for example. The input device 17 also includes a voice input device, such as a microphone that accepts voice input from the occupants of the vehicle 10, for example. The input device 17 also includes a gesture input device that accepts gesture input from the occupants of the vehicle 10, such as a camera capable of imaging occupants in the cabin of the vehicle 10. Input signals representing the contents of the inputs accepted in the input device 17 are taken into the central ECU 19 via the communication line inside the vehicle 10.

The display device 18, which is provided at a location that is easily viewed from the driver's seat in the cabin of the vehicle 10, displays various information screens. For example, the display device 18 is a liquid crystal display, an organic electroluminescence (EL) display, or the like. The display device 18 is communicably connected to the central ECU 19 through the communication line inside the vehicle 10. The central ECU 19 can output control signals to the display device 18 to control the display device 18 to display predetermined information screens.

For example, the central ECU 19 acts as a superordinate control device of various ECUs including the gateway ECU 12 and the ECU 13 mounted on the vehicle 10, to perform comprehensive control of the operation of various ECUs and function as a place to store various data used in the various ECUs.

The functions of the central ECU 19 may be implemented by any hardware, or by a combination of any hardware and software. For example, as shown in FIG. 2, the central ECU 19 includes an auxiliary storage device 19A, a memory device 19B, a CPU 19C, and an interface device 19D which are connected through a bus B1.

The auxiliary storage device 19A is a nonvolatile storage device that stores programs to be installed and stores required files, data, and the like. For example, the auxiliary storage device 19A is a flash memory or the like.

For example, when there is an instruction to start a program, the memory device 19B loads the program stored in the auxiliary storage device 19A to allow the CPU 19C to read the program. The memory device 19B is a static random-access memory (SRAM), for example.

The CPU 19C executes the program loaded to the memory device 19B, and implements various functions of the central ECU 19 in response to commands of the program, for example.

The interface device 19D is used, for example, as an interface for connecting to the communication line inside the vehicle 10. The interface device 19D may include a plurality of different types of interface devices depending on the type of the communication line to be connected.

The programs that implement various functions of the central ECU 19 are provided by a portable recording medium 19E, for example. In this case, the interface device 19D functions as an interface for reading data from the recording medium 19E and writing data to the recording medium 19E. The recording medium 19E is a special tool that is connected through a detachable cable to an external connection connector such as a data link coupler (DLC), for example. The recording medium 19E may be, for example, an SD memory card or a universal serial bus (USB) memory. The programs may be downloaded from another computer (e.g., distribution server 20) outside the vehicle 10 through a predetermined communication line, and be installed on the auxiliary storage device 19A.

Hardware Configuration of Distribution Server

Figure 3:
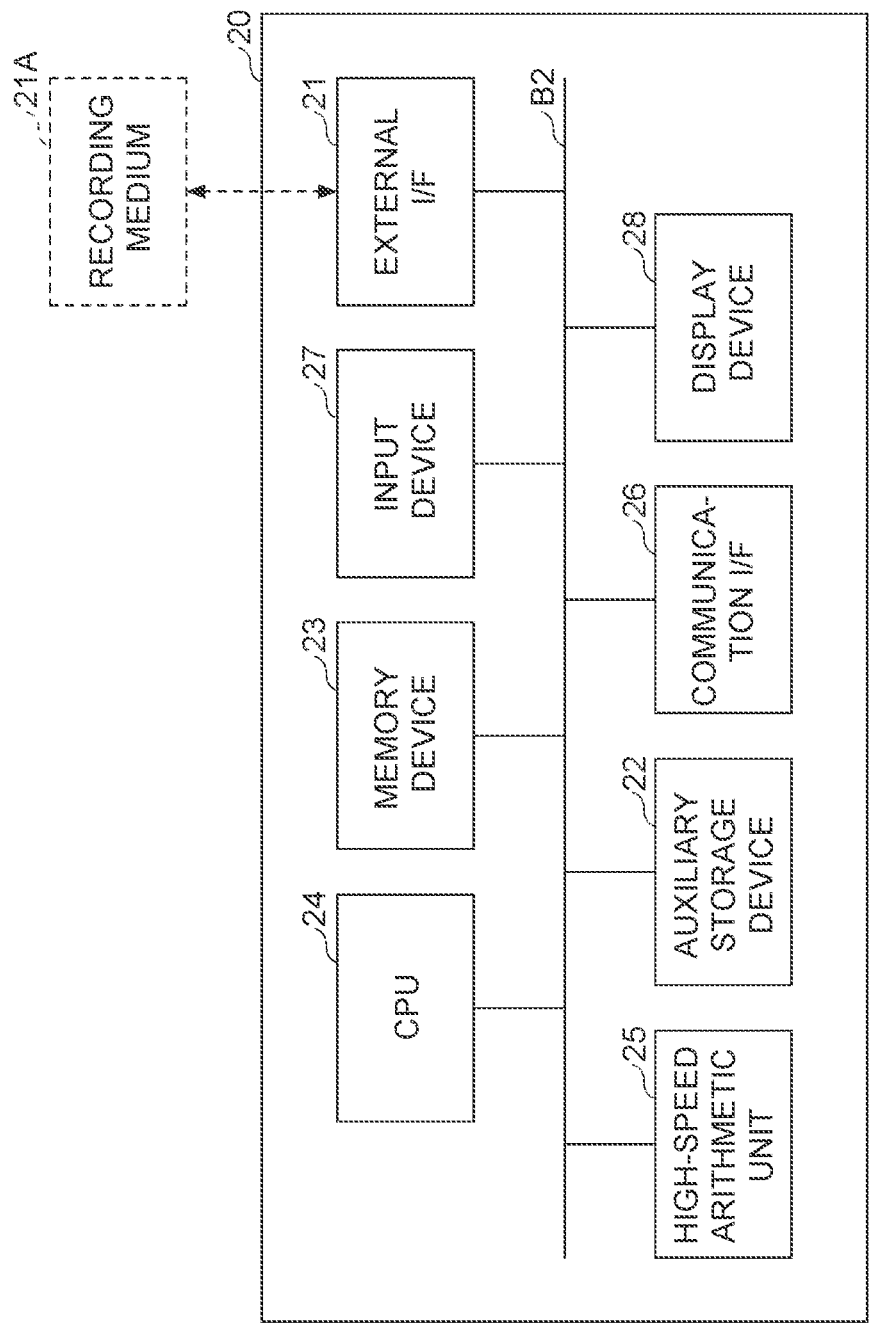
FIG. 3 shows an example of the hardware configuration of a distribution server.

FIG. 3 shows an example of the hardware configuration of the distribution server 20.

The functions of the distribution server 20 may be implemented by any hardware, or by a combination of any hardware and software. For example, as shown in FIG. 3, the distribution server 20 includes an external interface 21, an auxiliary storage device 22, a memory device 23, a CPU 24, a communication interface 26, an input device 27, and a display device 28, which are connected through a bus B2.

Here, the analysis server 30 and the user terminal 40 may also have the same hardware configuration as the distribution server 20. Hereinafter, illustration and description of the hardware configuration of the analysis server 30 and the user terminal 40 are omitted.

The external interface 21 functions as an interface for reading data from a recording medium 21A and writing data to the recording medium 21A. The recording medium 21A includes flexible disks, compact disc (CD), digital versatile disc (DVD), Blu-ray (registered trademark) disc (BD), SD memory cards, and a universal serial bus (USB) memory. This allows the distribution server 20 to read various data used for processing through the recording medium 21A, store the data in the auxiliary storage device 22, and install programs that implement various functions.

The distribution server 20 may acquire various data and programs from external devices through the communication interface 26.

The auxiliary storage device 22 stores installed various programs and stores files, data, and the like, required for various processing. The auxiliary storage device 22 includes a hard disk drive (HDD), a solid-state drive (SSD), and a flash memory, for example.

When there is an instruction to start a program, the memory device 23 reads the program from the auxiliary storage device 22 and store the read program. The memory device 23 includes, for example, a dynamic random-access memory (DRAM) and a static random access memory (SRAM).

The CPU 24 executes the various programs loaded from the auxiliary storage device 22 to the memory device 23, and implements the various functions of the distribution server 20 based on the programs.

A high-speed arithmetic unit 25 performs arithmetic processing at relatively high speeds in cooperation with the CPU 24. The high-speed arithmetic unit 25 includes, for example, a graphics processing unit (GPU), an application specific integrated circuit (ASIC), and a field-programmable gate array (FPGA).

The high-speed arithmetic unit 25 may be omitted depending on the speed of required processing.

The communication interface 26 is used as an interface for establishing a connection with external devices in a communicable way. This allows the distribution server 20 to communicate with external devices, such as the vehicle 10, the analysis server 30, and the user terminal 40, through the communication interface 26, for example. The communication interface 26 may also have a plurality of types of communication interfaces depending on the communication scheme or the like, used for communication with devices to be connected.

The input device 27 accepts various inputs from a user.

The input device 27 includes, for example, an operation input device that accepts mechanical operation input from the user. The operation input device includes buttons, toggles, and levers, for example. The operation input device includes, for example, a touch panel mounted on the display device 28 and a touch pad provided separately from the display device 28.

The input device 27 also includes, for example, a voice input device that can accept voice input from the user. The voice input device includes, for example, a microphone capable of collecting the voice of the user.

The input device 27 also includes, for example, a gesture input device that can accept input of gesture from the user. The gesture input device includes, for example, a camera that can image the user's gestures.

The input device 27 also includes, for example, a biometric input device that can accept a biometric input from the user. For example, the biometric input device includes a camera capable of acquiring image data that contains information about a user's fingerprint and iris.

The display device 28 displays information screens and operation screens to the user. For example, the display device 28 includes a liquid crystal display, an organic electroluminescence (EL) display, or the like.

Functional Configuration of Software Update System

Now, the functional configuration of the software update system 1 will be described with reference to FIG. 4 in addition to FIGS. 1 to 3.

Figure 4:
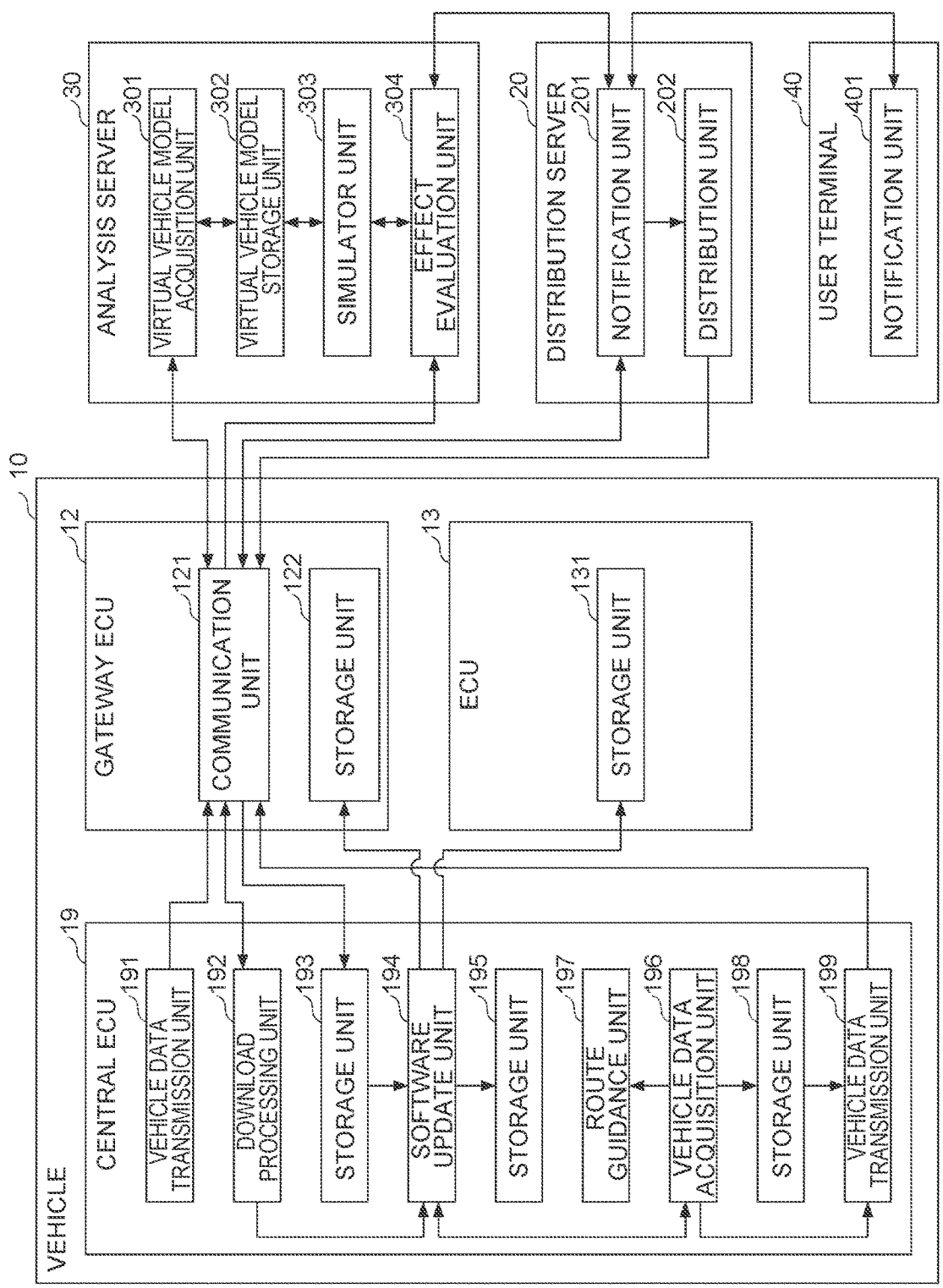
FIG. 4 is a functional block diagram showing an example of the functional configuration of the software update system.

FIG. 4 is a functional block diagram showing an example of the functional configuration of the software update system 1.

Functional Configuration of Vehicle

As shown in FIG. 4, the gateway ECU 12 includes a communication unit 121 and a storage unit 122 as functional units. The function of the communication unit 121 may be implemented by, for example, loading a program that is installed on the auxiliary storage device of the gateway ECU 12 into a memory device and executing the loaded program on the CPU. The function of the storage unit 122 may be implemented by, for example, a storage area defined in the auxiliary storage device or the like, of the gateway ECU 12.

The communication unit 121 controls the communication device 11 to take signals received from the outside of the vehicle 10 into the gateway ECU 12 and to transmit signals to the outside of the vehicle 10.

The storage unit 122 stores various data used in the gateway ECU 12. In the storage unit 122, data on various programs installed on the gateway ECU 12 (auxiliary storage device) is registered (stored), for example. In the storage unit 122, data on parameters referenced in the processing based on various programs of the gateway ECU 12 is registered (stored), for example.

The ECU 13 includes a storage unit 131 as a functional unit. The function of the storage unit 131 is implemented by, for example, a storage area defined in the auxiliary storage device of the ECU 13.

The storage unit 131 stores various data used in the ECU 13. In the storage unit 131, data for various programs installed on the ECU 13 (auxiliary storage device) is registered (stored), for example. In the storage unit 131, data on parameters referenced in the processing based on various programs of the ECU 13 is registered (stored), for example.

The central ECU 19 includes a vehicle data transmission unit 191, a download processing unit 192, a storage unit 193, a software update unit 194, and a storage unit 195 as functional units. The central ECU 19 also includes a vehicle data acquisition unit 196, a route guidance unit 197, a storage unit 198, and a vehicle data transmission unit 199. The functions of the vehicle data transmission unit 191, the download processing unit 192, the software update unit 194, the vehicle data acquisition unit 196, the route guidance unit 197, and the vehicle data transmission unit 199 may be implemented by loading programs to be installed on the auxiliary storage device 19A into the memory device 19B and executing the loaded programs on the CPU 19C, for example. The functions of the storage units 193, 195, 198 may be implemented by, for example, storage areas defined in the auxiliary storage device 19A.

The vehicle data transmission unit 191 acquires vehicle data representing the state of the vehicle 10, and transmits (uploads) the data to the analysis server 30 via the gateway ECU 12 (communication device 11) at each predetermined period. The vehicle data includes, for example, measurement data output from the sensor 15. The vehicle data also includes, for example, control data including command values output from various ECUs, such as the gateway ECU 12, the ECU 13, and the central ECU 19, and values as a result of arithmetic operations in the process of control processing. Hereinafter, the vehicle data to be transmitted by the vehicle data transmission unit 191 may be referred to as "first vehicle data" in a convenient manner so as to distinguish the vehicle data from vehicle data to be acquired by the vehicle data acquisition unit 196 (to be transmitted by the vehicle data transmission unit 199). For example, the vehicle data transmission unit 191 may upload the acquired first vehicle data to the analysis server 30 in real time. For example, the vehicle data transmission unit 191 may also accumulate the acquired first vehicle data in the memory device 19B or the auxiliary storage device 19A, and collectively transmit the accumulated vehicle data to the analysis server 30 at predetermined timing.

The download processing unit 192 performs processing regarding download of software update data from the distribution server 20.

The storage unit 193 stores software update data downloaded from the distribution server 20.

The software update unit 194 (an example of the update unit) updates the software used in the gateway ECU 12, the ECU 13, the central ECU 19 or the like, using the software update data downloaded into the storage unit 193.

As will be described later, when the function of the vehicle data acquisition unit 196 is transferred to the analysis server 30, the software update unit 194 may perform software update in response to a command from the distribution server 20 (e.g., notification unit 201).

The storage unit 195 stores various data used in the central ECU 19. In the storage unit 195, data for various programs installed on the central ECU 19 (auxiliary storage device) is registered (stored), for example. In the storage unit 195, data on parameters referenced in the processing based on various programs of the central ECU 19 is also registered (stored), for example.

When the software update unit 194 updates software of the vehicle 10, the vehicle data acquisition unit 196 (an example of the acquisition unit) acquires predetermined vehicle data before and after the update. Hereinafter, the vehicle data to be acquired by the vehicle data acquisition unit 196 may be referred to as "second vehicle data" in a convenient manner so as to distinguish the second vehicle data from the vehicle data (first vehicle data) to be transmitted (to be acquired) by the vehicle data transmission unit 191. The second vehicle data is the type of vehicle data required for the analysis server 30 to verify the effect obtained by the software update, and corresponds to some or all types of vehicle data among a plurality of types of vehicle data corresponding to the first vehicle data. The second vehicle data may vary depending on the type of software and the content of the update of the software. For example, information about the type of the second vehicle data to be acquired may be defined in advance in association with the content of the software update, i.e., the update data, and be distributed from the distribution server 20, the analysis server 30, or the like, to the vehicle 10. This allows the vehicle data acquisition unit 196 to acquire appropriate second vehicle data in matching with the content of the software update (update data).

For example, the vehicle data acquisition unit 196 records vehicle data of the types that should be acquired as the second vehicle data, as prescribed in accordance with the type of software, the content of the update, or the like, in a ring buffer defined in the memory device 19B, in a chronological order at each prescribed period. When a given condition (hereinafter referred to as "acquisition condition") prescribed in accordance with the type of software and the content of the update is established, the vehicle data acquisition unit 196 then acquires the vehicle data for a given period of time when the acquisition condition is established, from the ring buffer as the second vehicle data, and stores the second vehicle data in the storage unit 198. The acquisition condition includes, for example, travel conditions and environmental conditions of the vehicle 10 that are prerequisites for evaluating the effect of the software update. Alternatively, one acquisition condition or more acquisition conditions may be provided.

Note that the function of the vehicle data acquisition unit 196 may be transferred to the analysis server 30. In this case, the same functional unit of the analysis server 30 (an example of the acquisition unit) acquires (extracts) the second vehicle data that meets the acquisition condition, among the first vehicle data uploaded from the vehicle 10, for example. Then, the notification unit 201 (an example of the update unit) of the distribution server 20 may transmit a software update command to the vehicle 10, while checking the state of acquiring the second vehicle data before software update of the vehicle 10 in the analysis server 30. Accordingly, even when the function of the vehicle data acquisition unit 196 is transferred to the analysis server 30, the software update of the vehicle 10 can be performed after the second vehicle data before software update is acquired.

The route guidance unit 197 controls the navigation device 16 to guide (direct) the user (driver) of vehicle 10 to travel along a route suitable for acquiring the second vehicle data, while checking the position of the vehicle 10 based on the output of the GNSS sensor (sensor 15). For example, the central ECU 19 (route guidance unit 197) may directly output a control command to the navigation device 16 to control the navigation device 16. The central ECU 19 (route guidance unit 197) may also output a control command to the ECU 13 that controls the navigation device 16 so as to control the navigation device 16 through the ECU 13, for example.

The route suitable for acquiring the second vehicle data is a route where the software update changes the state of the vehicle 10 relatively frequently. For example, the condition of the route (road) suitable for acquiring the second vehicle data may be defined in advance by parameters, such as speed limit, average speed of passing vehicles, gradient, and curvature radii of curves, and be distributed from the distribution server 20, the analysis server 30, or the like, to the vehicle 10. Accordingly, the route guidance unit 197 can appropriately guide the user (driver) of the vehicle 10 to travel along the route suitable for acquiring the second vehicle data that matches the content of the software update.

When the function of the vehicle data acquisition unit 196 is transferred to the analysis server 30, the function of the route guidance unit 197 may also be transferred to the analysis server 30. In this case, the functional unit of the analysis server 30 may control the navigation device 16 from the outside of the vehicle 10, using a navigation server not illustrated, to guide a route for the vehicle 10.

The storage unit 198 stores the second vehicle data acquired by the vehicle data acquisition unit 196.

The vehicle data transmission unit 199 transmits the second vehicle data stored in the storage unit 198 to the analysis server 30 via the gateway ECU 12 (communication device 11).

Functional Configuration of Distribution Server

As shown in FIG. 4, the distribution server 20 includes the notification unit 201 and a distribution unit 202 as functional units. The functions of the notification unit 201 and the distribution unit 202 may be implemented by, for example, loading programs that are installed on the auxiliary storage device 22 to the memory device 23 and executing the loaded programs on the CPU 24.

When there is software update data available in the vehicle 10, the notification unit 201 notifies the presence of the software update to the vehicle 10. When the software update system 1 includes two or more vehicles 10, the presence of the software update data is notified to, out of all the vehicles 10, only the users of the vehicles 10 that are the targets of software update with the update data. For example, when the vehicles 10 include the vehicles 10 of two or more vehicle types, the presence or absence of software update or the content of the update may be different for each vehicle type. Even when, for example, all the vehicles 10 are of the same vehicle type, there may be difference in presence or absence of software update or the content of the update, depending on the grade. Moreover, for example, depending on the terms of agreement regarding the vehicles 10, the service available for the users may be different, i.e., the service provided to the users may be different according to the amount of price (fees) prescribed in the terms of the agreement, which may result in difference in presence or absence of software update or the content of the update.

Specifically, the notification unit 201 transmits to the vehicle 10 a signal that notifies the presence of software update data. This allows the central ECU 19 (download processing unit 192) of the vehicle 10 to notify, via the display device 18, the presence of the software update data. The notification unit 201 may also transmit a signal for notifying the presence of software update data to the user terminal 40 of the user of the vehicle 10 in place of or in addition to the vehicle 10. This allows the user terminal 40 (notification unit 401) to notify, via the display device, the presence of the software update data to the user of the vehicle 10. When the user needs to pay the price (fee) of the software update, the notification unit 201 may transmit a signal notifying the presence of software update data, including the content of the result of predicting the effect of the software update and the amount of price, to the vehicle 10 or the user terminal 40. This allows the central ECU 19 (download processing unit 192) of the vehicle 10 to notify, via the display device 18, the presence of the software update data to the user of the vehicle 10, along with the amount of price needed for the software update. The user terminal 40 (notification unit 401) can also notify, via the display device, the presence of the software update data to the user of the vehicle 10, along with the amount of price needed for the software update.

When a signal for permitting the software update (hereinafter "update permission signal") is received from the vehicle 10 or the user terminal 40 of the user of the vehicle 10, the notification unit 201 transmits a signal for notifying the update permission signal to the analysis server 30. The update permission signal indicates that the user of the vehicle 10 has made a predetermined input to permit software update through the input device 17 of the vehicle 10 or the input device of the user terminal 40. In this case, the signal includes information that identifies the target vehicle 10 (e.g., identification information such as an identifier (ID) defined for each vehicle 10, vehicle identification number (VIN), etc.), as well as information about the content of the software update. This enables the analysis server 30 (effect evaluation unit 304 described later) to grasp the vehicle 10 as an evaluation target regarding the effect of the software update, the content of the software update, or the like.

The distribution unit 202 distributes the software update data to the vehicle 10. For example, when an update permission signal is received from the vehicle 10 or the user terminal 40, the notification unit 201 transmits an update data distribution command to the distribution unit 202, and the distribution unit 202 transmits the update data to the target vehicle 10 in response to the distribution command.

Functional Configuration of Analysis Server

As shown in FIG. 4, the analysis server 30 includes a virtual vehicle model acquisition unit 301, a virtual vehicle model storage unit 302, a simulator unit 303, and an effect evaluation unit 304 as functional units. The functions of the virtual vehicle model acquisition unit 301, the simulator unit 303, and the effect evaluation unit 304 may be implemented by, for example, loading programs that are installed on the auxiliary storage device of the analysis server 30 into the memory device and executing the loaded programs on the CPU. The function of the virtual vehicle model storage unit 302 is implemented by, for example, a storage area defined in the auxiliary storage device of the analysis server 30.

The virtual vehicle model acquisition unit 301 (an example of the generation unit) acquires a virtual model corresponding to the vehicle 10 (hereinafter referred to as "virtual vehicle model"). The virtual vehicle model is a digital model that reproduces various features of the vehicle 10 on virtual space. The virtual vehicle model may be a full vehicle model that reproduces various features of the entire vehicle 10, or a partial vehicle model that reproduces only some features of the vehicle 10 which are targets of effect prediction as will be described later. The virtual vehicle model may also be a three-dimensional model that reproduces some or all of the shapes of the vehicle 10.

For example, the virtual vehicle model acquisition unit 301 acquires as a virtual vehicle model a general-purpose virtual model (an example of the general-purpose model) that is used for the vehicles 10 having the same vehicle type or having the same vehicle type and the same grade. For example, the general-purpose virtual vehicle model may be a full vehicle model or a partial vehicle model having vehicle type and grade of final specifications corresponding to the pertinent vehicle 10, which is created during the development phase of the vehicle type corresponding to the vehicles 10.

For example, the virtual vehicle model acquisition unit 301 may also acquire the virtual vehicle model by generating a dedicated virtual model (an example of the dedicated model) for each vehicle 10. Specifically, the virtual vehicle model acquisition unit 301 may generate a virtual vehicle model dedicated to the vehicle 10 by appropriately updating a virtual vehicle model that is prepared based on the general-purpose virtual vehicle model with use of the first vehicle data uploaded from the corresponding vehicle 10. This allows the virtual vehicle model acquisition unit 301 to generate (update) the virtual vehicle model in matching with at least secular change of the vehicle 10, use condition of the vehicle 10, and change in component members of the vehicle 10. Therefore, the virtual vehicle model dedicated to the vehicle 10 can reflect the secular change of the vehicle 10, the use condition of the vehicle 10, or the change in component members of the vehicle 10. The use condition of the vehicle 10 may include, for example, a condition relating to environments under which the vehicle 10 is used, a travel condition when the vehicle 10 is used, and a condition relating to frequency of use of the vehicle 10. The change in component members of the vehicle 10 may include, for example, change in hardware of the components or the like of the vehicle 10, change in software of the vehicle 10, and change in type of coolant and lubricants used in the vehicle 10. The virtual vehicle model acquisition unit 301 may also generate a digital twin as a dedicated model corresponding to the vehicle 10 by updating the virtual vehicle model in real time based on the vehicle data that is sequentially uploaded from the vehicle 10.

The virtual vehicle model storage unit 302 stores the virtual vehicle model acquired (generated) by the virtual vehicle model acquisition unit 301. When the software update system 1 includes more than one vehicle 10, virtual vehicle models for the respective vehicles 10 are stored. However, when the general-purpose model is acquired as the virtual vehicle model as described above, the general-purpose virtual vehicle model that is common to some or all of the vehicles 10 may be stored in the virtual vehicle model storage unit 302 as the virtual vehicle model.

The simulator unit 303 performs virtual simulation relating to the vehicle 10 using the virtual vehicle model of the vehicle 10 that is registered (stored) in the virtual vehicle model storage unit 302. The virtual simulation relating to the vehicle 10 includes a travel simulation of the vehicle 10 under a predetermined travel condition.

The effect evaluation unit 304 (an example of the evaluation unit) evaluates the effect achieved by updating the software used in the vehicle 10, based on the respective pieces of second vehicle data before and after software update of the vehicle 10, which are uploaded from the vehicle 10.

For example, the effect evaluation unit 304 evaluates the effect achieved by updating the software used in the vehicle 10 by comparing the respective pieces of second vehicle data before and after software update of the vehicle 10. Specifically, the effect evaluation unit 304 may compare the respective pieces of vehicle data on the effect of the software update, the vehicle data being included in the second vehicle data before and after the software update of the vehicle 10 or being derived (computed) from the second vehicle data. Accordingly, the effect evaluation unit 304 can evaluate the effect of the software update of the vehicle 10 relatively easily by comparing the second vehicle data acquired by the vehicle 10 (vehicle data acquisition unit 196).

For example, the effect evaluation unit 304 also uses the respective pieces of second vehicle data before and after the software update of the vehicle 10 to allow the simulator unit 303 to perform virtual simulation corresponding to before and after software update of the vehicle 10. Specifically, the simulator unit 303 may perform the virtual simulation of the vehicle 10 under the same travel conditions and environmental conditions, using virtual vehicle models corresponding to before and after software update of the vehicle 10, the virtual vehicle models reflecting the second vehicle data before and after software update of the vehicle 10, respectively. The travel condition used for the virtual simulation is variable depending on the type of the software and the content of the update, for example. This is because the travel condition under which the features of the vehicle 10 change due to the software update can vary depending on the type of the software, the content of the update, or the like. The effect evaluation unit 304 may evaluate the effect of the software update of the vehicle 10 by comparing the results of the virtual simulation corresponding to before and after the software update of the vehicle 10. Accordingly, the effect evaluation unit 304 can evaluate the effect of the software update of the vehicle 10 with a higher accuracy by comparing the results of the virtual simulation under the same conditions.

The effect evaluation unit 304 may evaluate the effect of the software update by using the result of comparing the second vehicle data before and after the software update and the result of comparing the results of virtual simulation corresponding to before and after the software update. For example, the effect evaluation unit 304 compares change in features of the vehicle 10 as a result of comparing the respective pieces of second vehicle data before and after the software update and change in features of the vehicle 10 as a result of comparing the results of the virtual simulation corresponding to before and after the software update. Specifically, the effect evaluation unit 304 may evaluate the effect of software update by, for example, averaging the change in features of the vehicle 10 as a result of comparing the pieces of second vehicle data on an actual vehicle 10 and the change in features of the vehicle 10 as a result of comparing the results of the virtual simulation.

In the case of evaluating the effect relating to whether the state of the vehicle 10 is achieved according to the content of the software update of the vehicle 10, the effect evaluation unit 304 may use only the second vehicle data after the update, among the second vehicle data before and after the update.

For example, in the case of evaluating the effect relating to the enhancement (improvement) of performance that corresponds to the purpose of the software update, the effect evaluation unit 304 may evaluate the presence or absence of the effect based on whether an index value of the performance improved by the software update exceeds a specified criteria. The effect evaluation unit 304 may also evaluate the degree of the effect based on the index value of the performance improved by the software update.

The effect evaluation unit 304 may also choose a method of evaluating the effect depending on the type of software and the content of the update, for example. Specifically, depending on the type of software and the content of the update, the effect evaluation unit 304 may determine whether to compare the respective pieces of second vehicle data before and after the software update of the vehicle 10 or to perform virtual simulation corresponding to before and after the software update of the vehicle 10. Which evaluation method to perform may be prescribed in advance for each piece of the update data, and be automatically determined in accordance with the prescribed content, for example. Whether to perform the virtual simulation may also be determined using table information or the like, based on the type of software, the content of the update, feature items of the vehicle 10 changed by the software update, or the like, for example.

Note that the function of the effect evaluation unit 304 may be transferred to the vehicle 10 (e.g., the central ECU 19). In this case, the same functional unit (an example of the evaluation unit) of the vehicle 10 (central ECU 19) evaluates the effect of the software update by, for example, checking the second vehicle data after the software update which is acquired by the vehicle data acquisition unit 196, or comparing the second vehicle data before and after the software update.

Functional Configuration of User Terminal

As shown in FIG. 4, the user terminal 40 includes the notification unit 401 as a functional unit. The function of the notification unit 401 may be implemented by, for example, loading a program that is installed on an auxiliary storage device of the user terminal 40 to a memory device and executing the loaded program on a CPU.

The notification unit 401 notifies the presence of software update of the vehicle 10 to the user via the display device, based on the signal received from the distribution server 20. This allows the user of the vehicle 10 to be aware of the presence of the software update of the vehicle 10 even at the timing when the user is not using the vehicle 10. Accordingly, for example, the user can input software update permission through the input device of the user terminal 40, which makes it possible to complete distribution of the update data to the vehicle 10 at the timing when the user is not using the vehicle 10.

Specific Examples of Method of Evaluating Effect of Vehicle Software Update

Description is now given of specific examples of the method of evaluating the effect of software update of the vehicle 10 by the effect evaluation unit 304 with reference to FIGS. 5 to 9. Specifically, an illustrative description will be given of the method of evaluating the effect relating to enhancement in performance that corresponds to the purpose of updating the software of the vehicle 10.

First Specific Example

Figure 5:
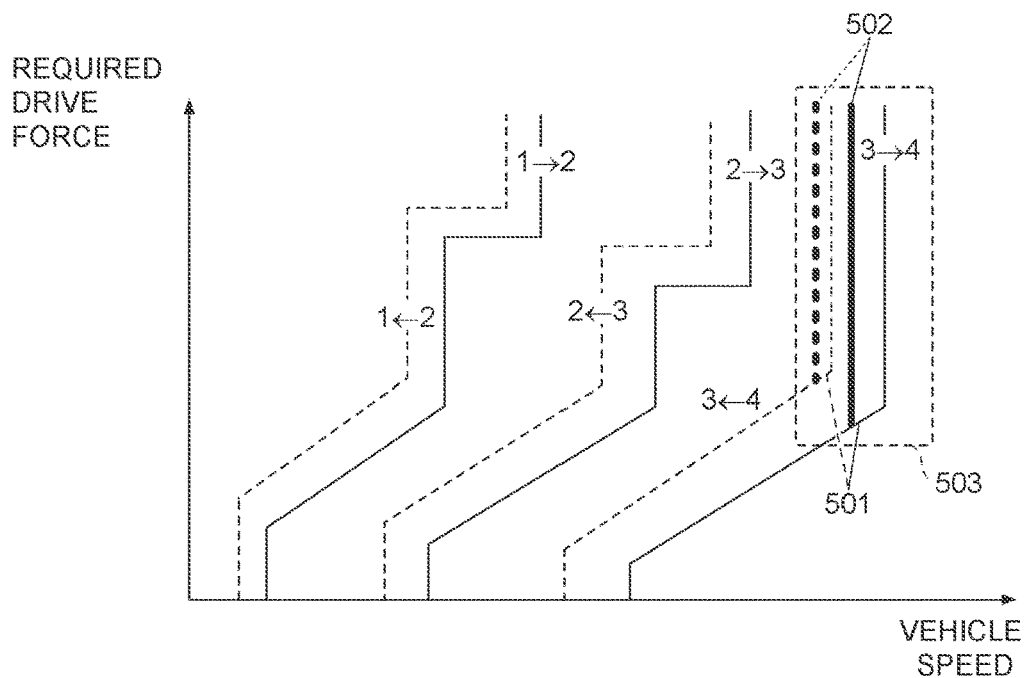
FIG. 5 shows an example of the update of a shift map for a transmission of the vehicle.

FIG. 5 shows an example of the update of a shift map 500 for a transmission of the vehicle 10. Specifically, FIG. 5 shows switching conditions between first gear and second gear, between second gear and third gear, and between third gear and fourth gear of the transmission of the vehicle 10 on a coordinate system with a horizontal axis being vehicle speed of the vehicle 10 and a vertical axis being required drive force of the vehicle 10.

Note that the required drive force of the vehicle 10 is determined, for example, in accordance with the accelerator operation amount by the driver of the vehicle 10. In FIG. 5, solid lines represent switching conditions (shift lines) during upshift, and dotted lines represent switching conditions (shift lines) during downshift.

As shown in FIG. 5, in this example, the switching condition between third gear and fourth gear is changed from shift lines 501 to shift lines 502 due to software update of the ECU 13 that controls the shift position of the transmission.

For example, the effect evaluation unit 304 uses the second vehicle data after software update in an operating region 503, where the switching condition between third gear and fourth gear is changed, to evaluate whether shifting in the transmission is appropriately implemented according to the content of the software update. The effect evaluation unit 304 may compare the second vehicle data before and after the software update in the operating region 503 to evaluate whether shifting in the transmission is appropriately implemented according to the content of the software update.

For example, the effect evaluation unit 304 also compares the second vehicle data regarding the motive power performance before and after the software update in the operating region 503 to evaluate the effect of enhancement in motive power performance (e.g., acceleration performance) of the vehicle 10. The effect evaluation unit 304 may also compare the results of the virtual simulation based on virtual vehicle models that reflect the second vehicle data before and after the software update in the operating region 503 to evaluate the effect of enhancement in the motive power performance of the vehicle 10.

For example, the effect evaluation unit 304 also compares the second vehicle data regarding energy saving performance, such as electric power efficiency performance and fuel efficiency performance, before and after the software update in the operating region 503 to evaluate the energy saving performance of the vehicle 10. The effect evaluation unit 304 may also compare the results of the virtual simulation based on the virtual vehicle models that reflect the respective pieces of second vehicle data before and after the software update in the operating region 503 to evaluate the effect of enhancement in the energy saving performance of the vehicle 10.

Thus, in this example, the effect evaluation unit 304 can evaluate the effect achieved by updating the software (shift map) of the vehicle 10 based on the second vehicle data uploaded from the vehicle 10.

Second Specific Example

Figure 6:
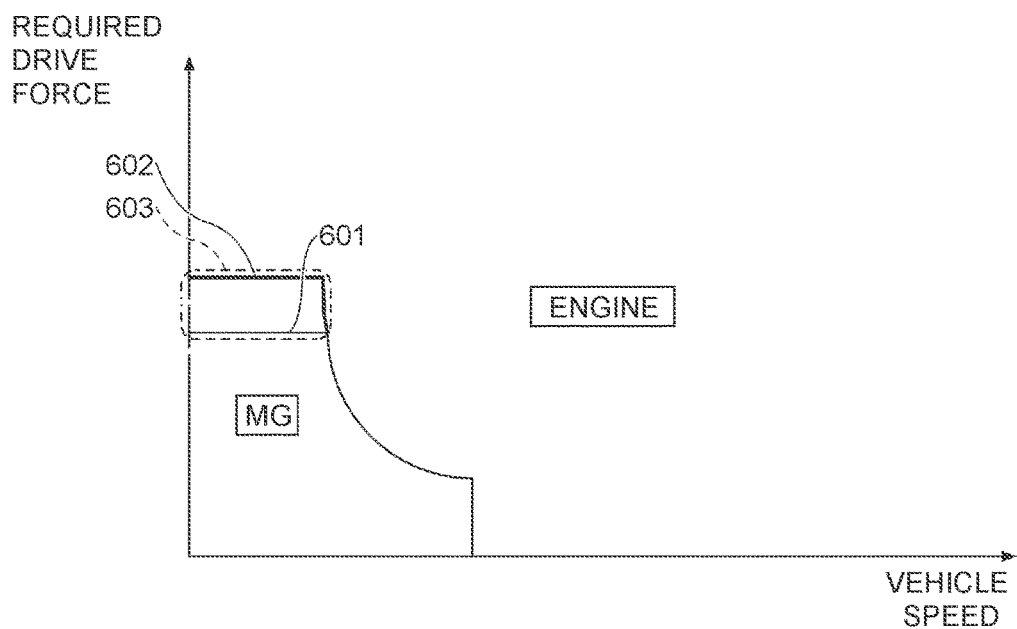
FIG. 6 shows an example of the update of a switching map of motors of the vehicle.

FIG. 6 shows an example of the update of a motor switching map 600 of the vehicle 10. In this example, the vehicle 10 is a so-called hybrid electric vehicle capable of traveling by switching between two motors: an engine and a motor generator. Specifically, FIG. 6 shows a switching condition between the state in which the vehicle 10 travels with only the motor generator (MG) with the engine being stopped and the state in which the engine is started and the vehicle 10 travels with the engine, on the coordinate system with a horizontal axis being vehicle speed of the vehicle 10 and a vertical axis being required drive force of the vehicle 10.

Note that the state where the vehicle 10 travels with the engine may include both the state where the vehicle 10 travels with only the engine and the state where the vehicle 10 travels with both the engine and the motor generator.

As shown in FIG. 6, in this example, due to the software update in the ECU 13 that performs comprehensive control of the operating state of the two motors, a switching condition for switching between the state where the vehicle 10 travels with only the motor generator and the state where the vehicle 10 travels with the engine is updated from a switching line 601 (thin solid line) to a switching line 602 (thick solid line).

For example, the effect evaluation unit 304 uses the second vehicle data after software update in an operating region 603, where the motor switching condition is changed, to evaluate whether switching between two motors is appropriately implemented according to the content of the software update. The effect evaluation unit 304 may also compare the second vehicle data before and after the software update in the operating region 603 to evaluate whether switching of the two motors is appropriately implemented according to the content of the software update.

For example, the effect evaluation unit 304 compares the second vehicle data regarding the fuel efficiency performance before and after the software update in the operating region 603 to evaluate the effect of enhancement in the fuel efficiency performance of the vehicle 10. The effect evaluation unit 304 may also compare the results of the virtual simulation based on the virtual vehicle models that reflect the second vehicle data before and after the software update in the operating region 603 to evaluate the effect of enhancement in the motive power performance of the vehicle 10.

Thus, in this example, the effect evaluation unit 304 can evaluate the effect by updating the software (motor switching map) based on the second vehicle data uploaded from the vehicle 10.

Third Specific Example

Figure 7:
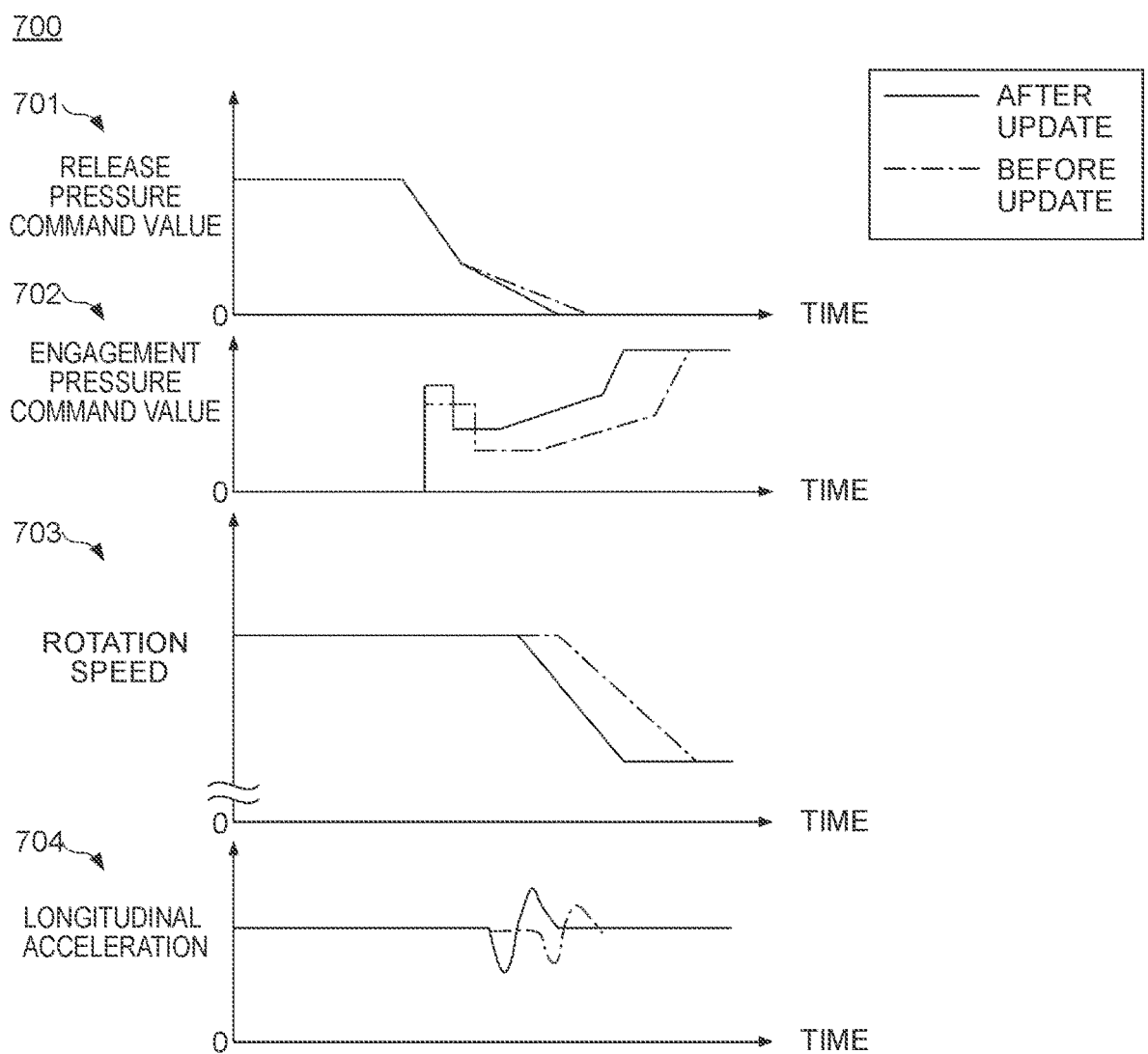
FIG. 7 shows an example of secular change in the actual state of the vehicle during shift change of the transmission before and after update of a control logic relating to a shift change (upshift) of the transmission of the vehicle.
Figure 8:
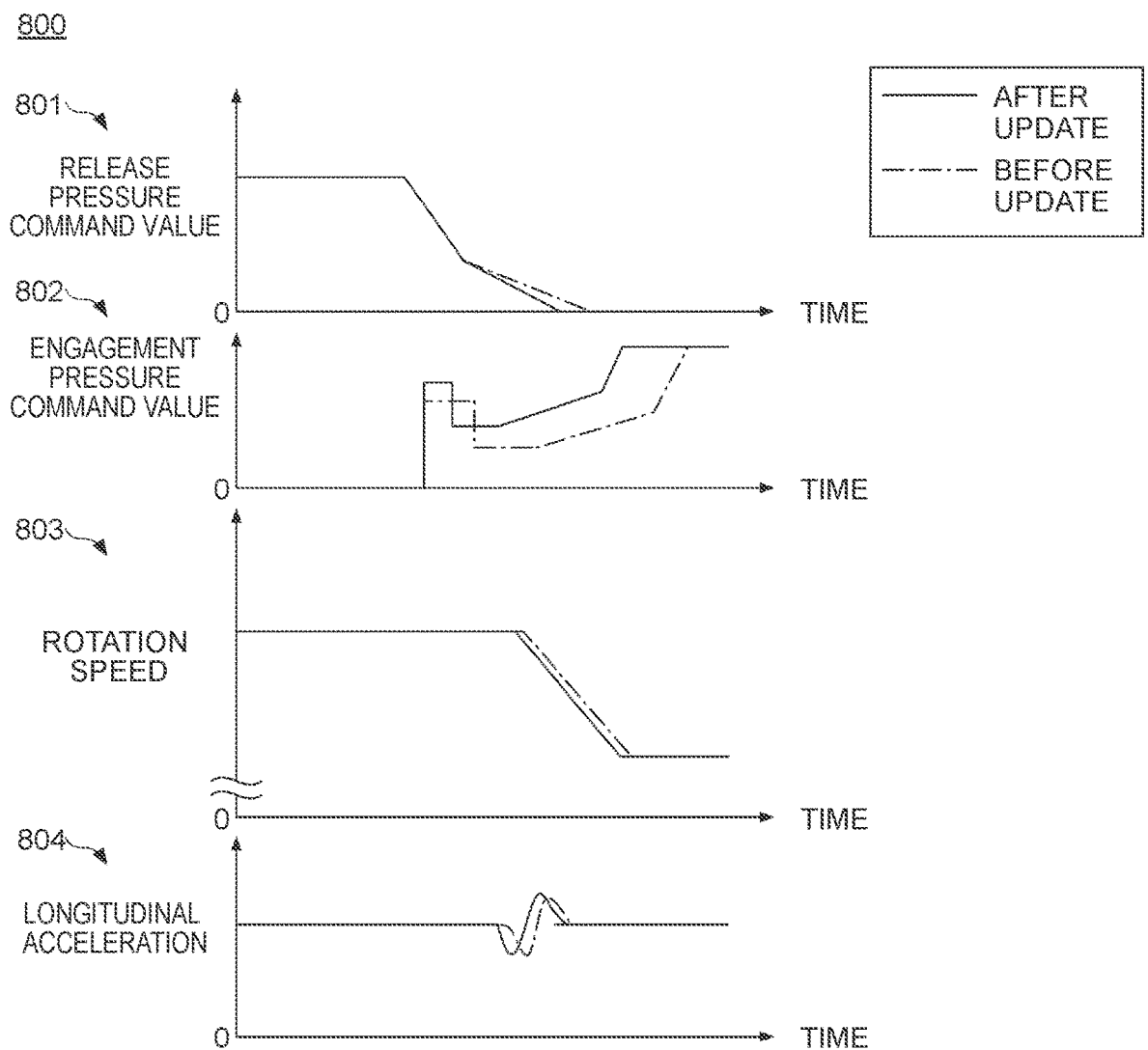
FIG. 8 shows another example of secular change in the actual state of the vehicle during shift change of the transmission before and after update of the control logic relating to the shift change (upshift) of the transmission of the vehicle.
Figure 9:
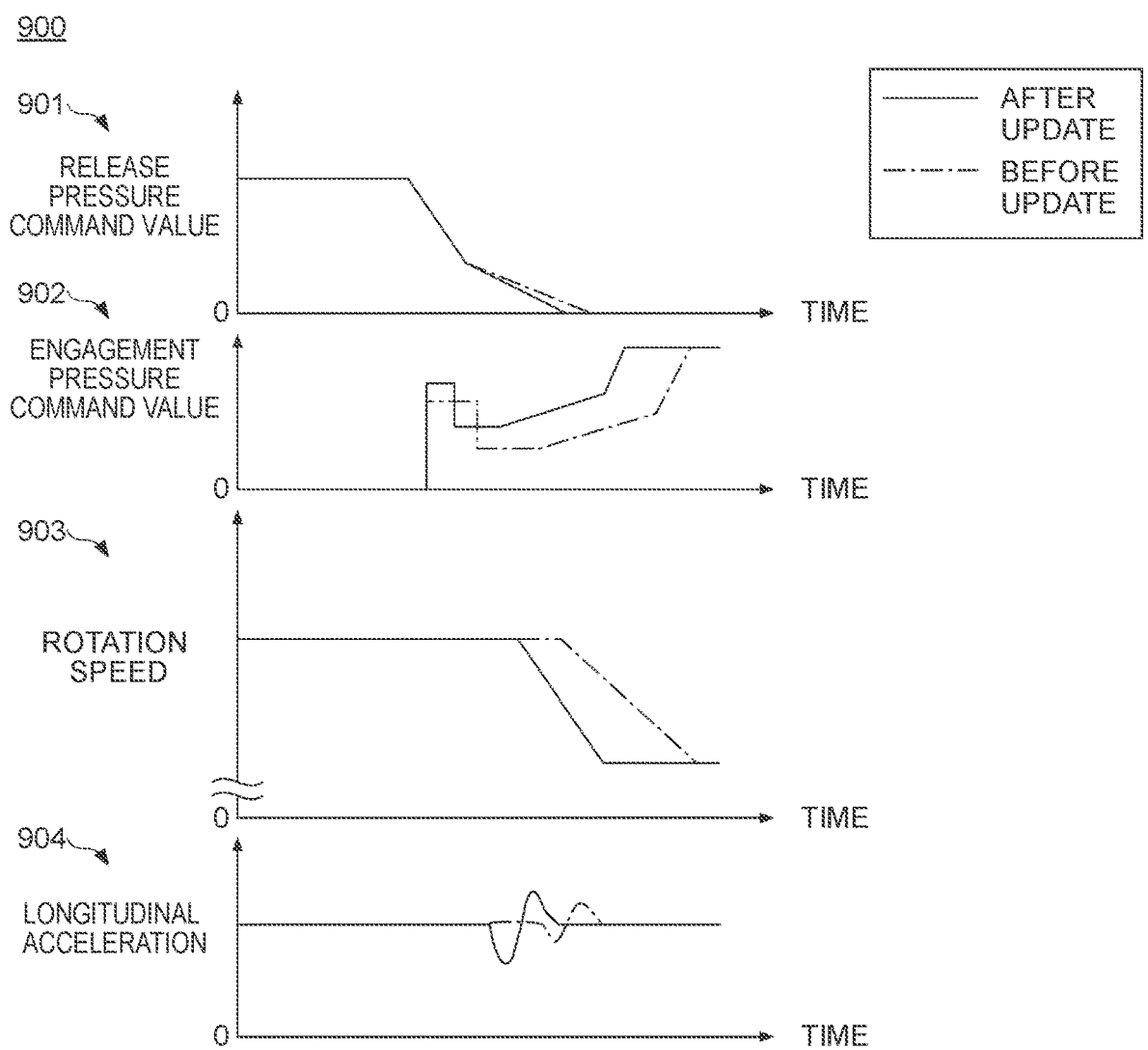
FIG. 9 shows an example of the results of a virtual simulation regarding secular change in the state of the vehicle during shift change of the transmission before and after update of the control logic relating to the shift change (upshift) of the transmission of the vehicle.

FIG. 7 shows an example (time chart 700) of secular change in an actual state of the vehicle 10 during shift change of the transmission before and after update of a control logic relating to shift change (upshift) of the transmission of the vehicle 10. Specifically, FIG. 7 shows the second vehicle data of the vehicle 10 included in the software update system 1. The time chart 700 includes time charts 701 to 704 representing secular change in release pressure command value, engagement pressure command value, rotation speed of motor (engine), and longitudinal acceleration of the vehicle 10 during shift change of the transmission. FIG. 8 shows another example (time chart 800) of secular change in the state of the vehicle 10 during shift change of the transmission before and after update of the control logic relating to the shift change (upshift) of the transmission of the vehicle 10. Specifically, FIG. 8 shows the second vehicle data of another vehicle 10 mounted with a transmission having the same specifications as those of the one vehicle 10 included in the software update system 1. The time chart 800 includes time charts 801 to 804 representing secular change in release pressure command value, engagement pressure command value, rotation speed of an output shaft of the transmission, and longitudinal acceleration of the vehicle 10 during shift change of the transmission. FIG. 9 shows an example (time chart 900) of the results of virtual simulation regarding secular change in the state of the vehicle 10 during shift change of the transmission before and after update of the control logic relating to the shift change (upshift) of the transmission of the vehicle 10. Specifically, FIG. 9 shows the results of the virtual simulation based on a virtual vehicle model dedicated to the one vehicle 10 included in the software update system 1. The time chart 900 includes time charts 901 to 904 representing secular change in release pressure command value, engagement pressure command value, rotation speed of the output shaft of the transmission, and longitudinal acceleration of the vehicle 10 during shift change of the transmission.

Here, the release pressure command value represents a hydraulic pressure command value for actuating the component members (e.g., a brake, a clutch, etc.) of the transmission that shifts from an engaged state to a released state due to the shift change. The engagement pressure command value represents a hydraulic pressure command value for actuating the component members of the transmission that shifts from the released state to the engaged state due to the shift change. In FIGS. 7 to 9, the control logics for shift change of the transmission before and after the update are the same. Therefore, the time charts 701, 702, the time charts 801, 802, and the time charts 901, 902, corresponding to the control logics, are the same.

As shown in FIGS. 7 to 9, in this example, the control logic for the shift change of the transmission is updated so as to reduce the time (shifting time) from the start of shift change (upshift) (the start of reducing the release pressure command value) to the end of shift change (the end of increasing the engagement pressure).

For example, the effect evaluation unit 304 uses the time charts 701, 702 after software update to evaluate whether the control logic is appropriately implemented according to the content of the software update in the one vehicle 10. Similarly, the effect evaluation unit 304 may use the time charts 801, 802 after software update to evaluate whether the control logic is appropriately implemented according to the content of the software update in the other vehicle 10. The effect evaluation unit 304 may also compare the time charts 701, 702 before and after software update to evaluate whether the control logic is appropriately implemented according to the content of the software update in the one vehicle 10. Similarly, the effect evaluation unit 304 may compare the time charts 701, 702 before and after software update to evaluate whether the control logic is appropriately implemented according to the content of the software update in the other vehicle 10.

For example, the effect evaluation unit 304 also compares the time charts 703, 704 before and after software update to evaluate the effect of improving the speed of shift change (shifting speed) of the transmission. Similarly, the effect evaluation unit 304 may also compare the time charts 803, 804 before and after the software update to evaluate the effect of improving the speed of shift change (shifting speed) of the transmission.

In the time chart 703, the speed of change (rate of change over time) in rotation speed of the motor (engine) due to the shift change of the transmission is relatively large due to the update of the control logic. In the time chart 704, a fluctuation in longitudinal acceleration of the vehicle 10 with the shift of the transmission is also relatively large. Therefore, the user of the one vehicle 10 can clearly sense improved shifting speed of the transmission. Therefore, in the case of the one vehicle 10, the effect evaluation unit 304 can evaluate that the software update has the effect of improving the shifting speed or that the degree of the effect is relatively high.

Meanwhile, in the time chart 803, the change speed (rate of change over time) in rotation speed of the motor (engine) due to the shift change of the transmission does not substantially change before and after the update of the control logic. In the time chart 804, there is little change in the magnitude of the fluctuation in longitudinal acceleration of the vehicle 10 due to shift change of the transmission before and after the control logic is updated. Hence, it is difficult for the user of another vehicle 10 to sense the improved shifting speed of the transmission. Therefore, in the case of the other vehicle 10, the effect evaluation unit 304 can evaluate that the software update has no effect of improving the shifting speed or that the degree of the effect is relatively low.

Here, it may be considered that the effect by updating the control logic differs depending on the vehicles 10 that are mounted with the transmission having the same specifications due to, for example, the influence of viscosity of the lubricants used in the transmission. For example, when commercial lubricants that are more viscous than the lubricants that are filled at shipment from factory are used in the transmission, it may be difficult for the user to sense the improved shifting speed. It may also be considered that the effect of updating the control logic differs depending on the vehicles 10 that are mounted with the transmission having the same specifications due to, for example, variations in the manufacturing of clutch pack clearance of the transmission. For example, when the clutch pack clearance of the transmission is close to a lower limit within manufacturing tolerances, it may be more difficult for the user to sense the improvement in the shifting speed than when the clutch pack clearance is close to an upper limit. It may also be considered that the effect of updating the control logic differs depending on the vehicles 10 that are mounted with the transmission having the same specifications due to, for example, the influence of the accumulated number of shifting in the transmission. For example, when the accumulated number of shifting after the vehicle 10 is shipped from factory or after the transmission is replaced with a new product is relatively small, the clutch pack clearance of the transmission may be relatively smaller than when the accumulated number of shifting is large, which may make it difficult for the user to sense the improved shifting speed. It may also be considered that the effect of updating the control logic differs depending on the vehicles 10 that are mounted with the transmission having the same specifications due to, for example, the influence of an air leak in solenoid valves that engage and release the clutch and brake of the transmission. For example, when the air leak in the solenoid valves of the transmission is relatively small, the shifting speed is relatively higher than when the air leak is relatively large. Hence, it may be difficult for the user to sense the improved shifting speed even when the control logic is updated. It may also be considered that the effect of updating the control logic differs depending on the vehicles 10 that are mounted with the transmission having the same specifications due to, for example, the influence of temperature environments where the vehicle 10 is used. For example, when the vehicle 10 is used in so-called cold climate where the temperature is very low, the lubricating oil has a higher viscosity than when the vehicle 10 is used in relatively high temperatures. Hence, it may be difficult for the user to sense the improved shifting speed even when the control logic is updated.

For example, the effect evaluation unit 304 may also evaluate the effect of improving the shift change speed (shifting speed) of the transmission in one vehicle 10 by using the time charts 903, 904 showing the results of the virtual simulation, in place of or in addition to the time charts 703, 704. Specifically, the effect evaluation unit 304 may compare the time charts 903, 904 corresponding to before and after the software update to evaluate the effect of improving the speed of shift change (shifting speed) of the transmission in one vehicle 10. Accordingly, the effect evaluation unit 304 can compare the time charts showing the rotation speed of the output shaft of the transmission, and the longitudinal acceleration of the vehicle 10, in which various conditions, such as travel conditions and environmental conditions before and after the software update, are adjusted to be identical. Therefore, the effect evaluation unit 304 can evaluate the effect of improving the shifting speed of the transmission in one vehicle 10 with a higher accuracy.

In the time chart 903, as in the case of the time chart 703, the speed of change (rate of change over time) in rotation speed of the motor (engine) due to the shift change of the transmission is relatively large due to the update of the control logic. In the time chart 904, as in the case of the time chart 704, the fluctuation in longitudinal acceleration of the vehicle 10 with the shift change of the transmission is also relatively large. Therefore, the user of the one vehicle 10 can clearly sense the improvement in shifting speed of the transmission. Therefore, in the case of the one vehicle 10, the effect evaluation unit 304 can evaluate that the software update has the effect of improving the shifting speed or that the degree of the effect is relatively high.

Here, as in the case of the one vehicle 10, the effect evaluation unit 304 may also evaluate the effect of improving the shift change speed (shifting speed) of the transmission in another vehicle 10 by using the time charts showing the results of the virtual simulation, in place of or in addition to the time charts 803, 804.

Thus, in this example, the effect evaluation unit 304 can evaluate the effect by updating the software (program relating to the control logic for shift change of the transmission) based on the second vehicle data uploaded from the vehicle 10.

Example of Software Update Processing

Description is now given of an example of the processing for updating software (hereinafter "software update processing") of the vehicle 10 by the central ECU 19 with reference to FIGS. 10 and 11.

Figure 10:
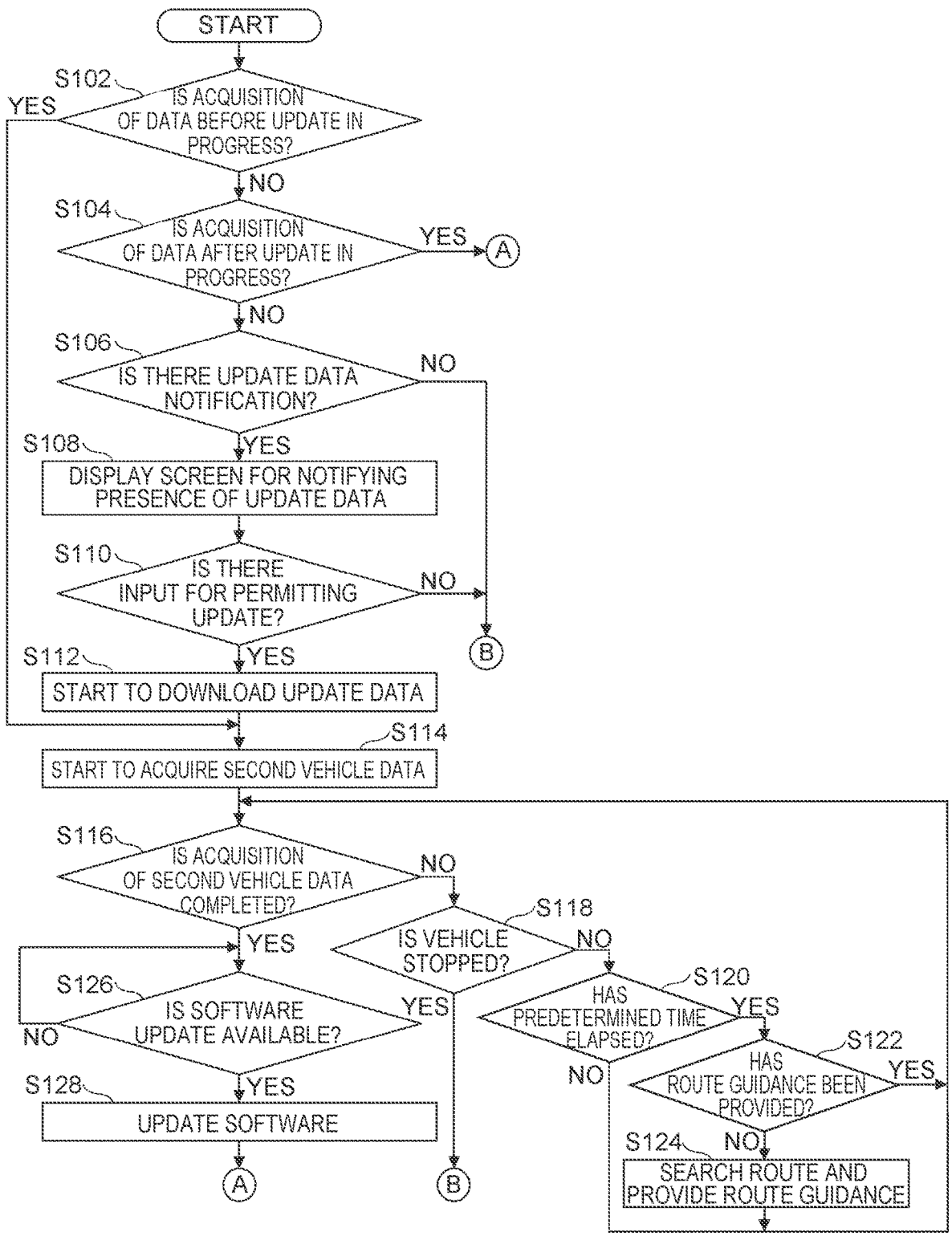
FIG. 10 is a flowchart schematically showing an example of software update processing by a central ECU.
Figure 11:
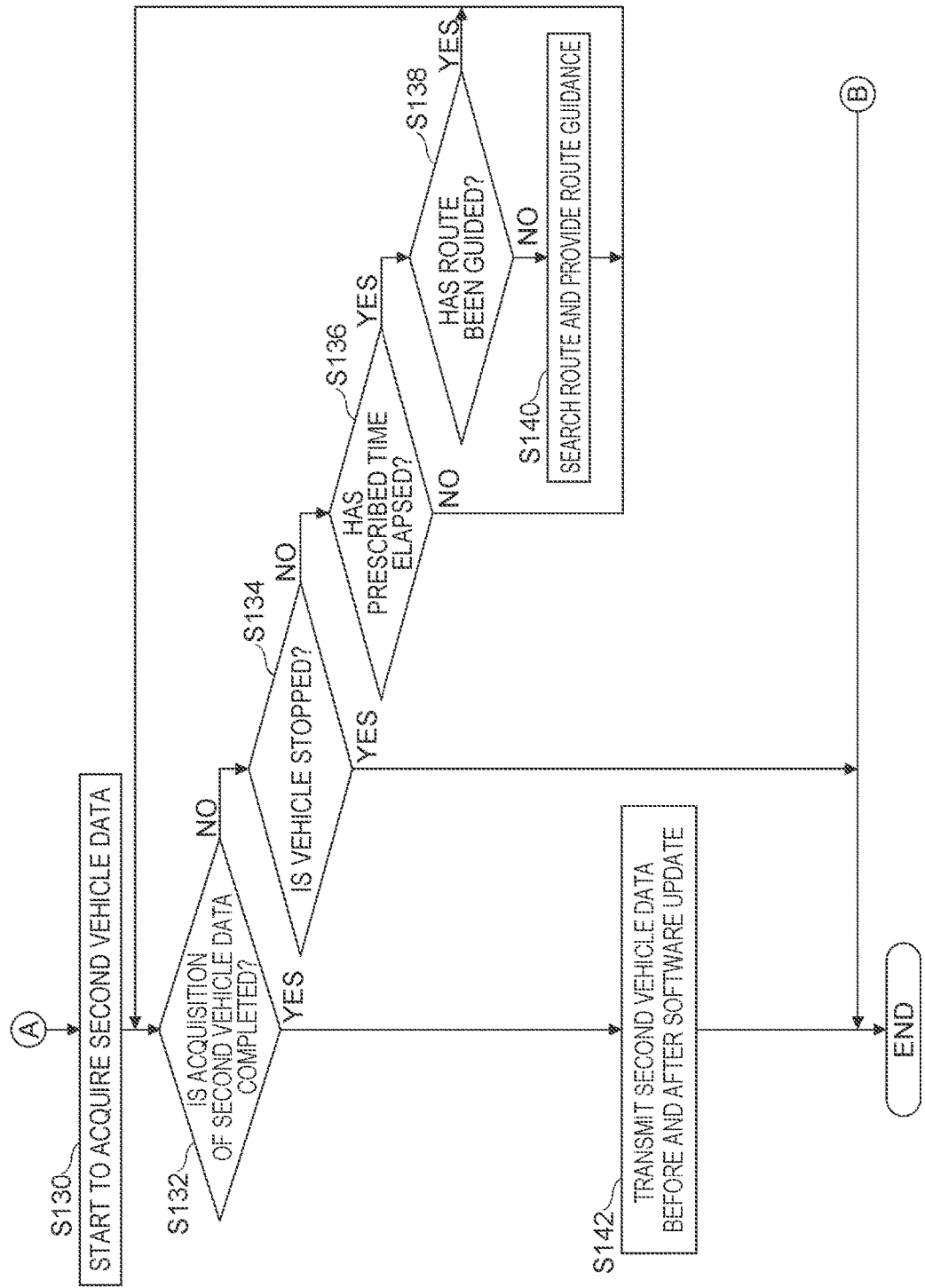
FIG. 11 is a flowchart schematically showing an example of the software update processing by the central ECU.

FIGS. 10 and 11 are flowcharts schematically showing an example of the software update processing by the central ECU 19. The flowchart is repeatedly executed between, for example, the end of initial processing at a startup of the vehicle 10 and the start of termination processing to stop the vehicle. The startup of the vehicle 10 is, for example, turning on an ignition switch of the vehicle 10, and the stop of the vehicle 10 is, for example, turning off the ignition switch of the vehicle 10.

Here, this example is described on the assumption that the gateway ECU 12 and the central ECU 19 are operable even when the vehicle 10 is stopped.

As shown in FIG. 10, in step S102, the vehicle data acquisition unit 196 determines whether acquisition of second vehicle data before software update, which is started in step S114 as will be described later, is in progress. When the acquisition of the second vehicle data before software update is in progress, the vehicle data acquisition unit 196 proceeds to step S114. Otherwise, the vehicle data acquisition unit 196 proceeds to step S104.

In step S104, the vehicle data acquisition unit 196 determines whether acquisition of second vehicle data after software update, which is started in step S130 as will be described later, is in progress. When the acquisition of the second vehicle data after software update is in progress, the vehicle data acquisition unit 196 proceeds to step S130. Otherwise, the vehicle data acquisition unit 196 proceeds to step S106.

In step S106, the download processing unit 192 determines whether a signal for notifying the presence of software update data is received from the distribution server 20. When the signal for notifying the presence of the update data is received from the distribution server 20, the download processing unit 192 proceeds to step S108. Otherwise, the download processing unit 192 ends this flowchart processing.

In step S108, the download processing unit 192 displays on the display device 18 a screen for notifying the presence of the software update data.

When the processing of step S108 is completed, and an input regarding permission or rejection of the software update is accepted via the input device 17, the central ECU 19 proceeds to step S110.

In step S110, the download processing unit 192 determines whether the input for permitting the software updates is accepted. When the input for permitting the software update is accepted, the download processing unit 192 proceeds to step S112. When an input for rejecting the software update is accepted, the download processing unit 192 ends this flowchart.

In step S112, the download processing unit 192 starts to download the update data.

When the processing of step S112 is completed, the central ECU 19 proceeds to step S114.

Note that the update data may be download to the vehicle 10 before user permission or rejection of the software update is confirmed. In this case, the processing of step S112 is omitted.

In step S114, the vehicle data acquisition unit 196 starts to acquire the second vehicle data.

When the processing of step S114 is completed, the central ECU 19 proceeds to step S116.

In step S116, the vehicle data acquisition unit 196 (an example of the determination unit) determines whether acquisition of the second vehicle data is completed. For example, when there are two or more of the acquisition conditions, the vehicle data acquisition unit 196 determines whether acquisition of the second vehicle data is completed for each of the acquisition conditions. When acquisition of the second vehicle data is not completed, the vehicle data acquisition unit 196 proceeds to step S118. When the acquisition of the second vehicle data is completed, the vehicle data acquisition unit 196 proceeds to step S126.

In step S118, the vehicle data acquisition unit 196 determines whether the vehicle 10 is stopped (for example, whether the ignition switch is turned off). When the vehicle 10 is not stopped, the vehicle data acquisition unit 196 proceeds to step S120. On the other hand, when the vehicle 10 is stopped, for example, the vehicle data acquisition unit 196 turns on a flag indicating that acquisition of the second vehicle data before software update is in progress, and ends this flowchart processing. As a result, at the next startup of the vehicle 10, the vehicle data acquisition unit 196 can determine in step S102 that acquisition of the second vehicle data before software update is in progress.

In step S120, the vehicle data acquisition unit 196 determines whether prescribed time has elapsed after the start of acquiring the second vehicle data. The prescribed time may be fixed, regardless of the type of software or the content of the update, or may vary depending on the type of software and the content of the update. When the prescribed time has elapsed after the start of acquiring the second vehicle data, the vehicle data acquisition unit 196 proceeds to step S122. When the prescribed time is not yet elapsed, the vehicle data acquisition unit 196 returns to step S116.

In step S122, the route guidance unit 197 determines whether a route guidance, suitable for acquiring the second vehicle data in step S124 described later, has been performed. When the route guidance has not yet performed, the route guidance unit 197 proceeds to step S124. When the route guidance has been performed, the route guidance unit 197 returns to step S116.

In step S124, the route guidance unit 197 controls the navigation device 16 to search for the route suitable for acquiring the second vehicle data and guide (direct) the user (driver) of the vehicle 10 to travel along the route.

When the processing of step S124 is completed, the central ECU 19 returns to step S116.

Here, the route guidance unit 197 may search for the route suitable for acquiring the second vehicle data in concurrence with the start of acquiring the second vehicle data by the vehicle data acquisition unit 196, and start to guide the user (driver) of the vehicle 10 to travel along the route. In this case, the processing of step S124 is performed immediately before step S114. When the processing of steps S120, S122 are also omitted, and it is determined in step S118 that the vehicle 10 is not stopped, the processing returns to step S116. The processing of step S124 may also be omitted. In this case, when the processing of steps S120, S122 are also omitted, and it is determined in step S118 that the vehicle 10 is not stopped, the processing returns to step S116.

In step S126, the software update unit 194 determines whether software update is available. The software update unit 194 determines that the software update is available when, for example, the download of the update data by the download processing unit 192 is completed, and the vehicle 10 is in a state suitable for the software update.

The state of the vehicle 10 suitable for software update varies depending on the type of software and the content of the update. For example, in the case of a software update relating to traveling of the vehicle 10 (for example, software update in FIGS. 5 to 9), the state of the vehicle 10 suitable for software update is a stopped state of the vehicle 10 (e.g., the ignition switch turned off). Meanwhile, for example, in the case of a software update not relating to traveling of the vehicle 10, the state of the vehicle 10 suitable for software update may include states from the startup to the stop of the vehicle 10. Information about the state of the vehicle 10 suitable for software update may be defined in advance for each piece of update data and be downloaded from the distribution server 20 to the central ECU 19 together with the update data.

When software update is available, the software update unit 194 proceeds to step S128. When software update is not available, the software update unit 194 waits until the software update becomes available while repeating the processing of step S126.

In step S128, the software update unit 194 uses the update data downloaded to the storage unit 193 to perform software update.

When the processing of step S128 is completed, the central ECU 19 proceeds to step S130.

In step S130, the vehicle data acquisition unit 196 starts to acquire the second vehicle data as described in FIG. 11.

When the processing of step S130 is completed, the central ECU 19 proceeds to step S132.

In step S132, the vehicle data acquisition unit 196 determines whether acquisition of the second vehicle data is completed. When acquisition of the second vehicle data is not completed, the vehicle data acquisition unit 196 proceeds to step S134. When the acquisition of the second vehicle data is completed, the vehicle data acquisition unit 196 proceeds to step S142.

In step S134, the vehicle data acquisition unit 196 determines whether the vehicle 10 is stopped (for example, whether the ignition switch is turned off). When the vehicle 10 is not stopped, the vehicle data acquisition unit 196 proceeds to step S136. On the other hand, when the vehicle 10 is stopped, the vehicle data acquisition unit 196 turns on a flag indicating that acquisition of the second vehicle data after software update is in progress, and ends this flowchart processing, for example. As a result, at the next startup of the vehicle 10, the vehicle data acquisition unit 196 can determine in step S104 that acquisition of the second vehicle data after software update is in progress.

In step S136, the vehicle data acquisition unit 196 determines whether prescribed time has elapsed after the start of acquiring the second vehicle data. The prescribed time may be fixed, regardless of the type of software or the content of the update, or may vary depending on the type of software and the content of the update. When the prescribed time has elapsed after the start of acquiring the second vehicle data, the vehicle data acquisition unit 196 proceeds to step S138. When the prescribed time is not yet elapsed, the vehicle data acquisition unit 196 returns to step S132.

In step S138, the vehicle data acquisition unit 196 determines whether a route guidance, suitable for acquiring the second vehicle data in step S140 described later, has been performed. When the route guidance is not yet performed, the vehicle data acquisition unit 196 proceeds to step S140. When the route guidance has been performed, the vehicle data acquisition unit 196 returns to step S132.

In step S140, as in the case of step S124, the route guidance unit 197 controls the navigation device 16 to search for the route suitable for acquiring the second vehicle data and guide (direct) the user (driver) of the vehicle 10 to travel along the route. In this case, the route guidance unit 197 may guide the route same as the route used to acquire the second vehicle data before software update, as the route suitable for acquiring the second vehicle data.

When the processing of step S140 is completed, the central ECU 19 returns to step S132.

Here, the route guidance unit 197 may search for the route suitable for acquiring the second vehicle data in concurrence with the start of acquisition of the second vehicle data performed by the vehicle data acquisition unit 196 and start to guide the user (driver) of the vehicle 10 to travel along the route. In this case, the processing of step S140 is performed immediately before step S130. When the processing of steps S136, S138 are also omitted, and it is determined in step S134 that the vehicle 10 is not stopped, the processing returns to step S132. The processing of step S140 may also be omitted. In this case, when the processing of steps S136, S138 are also omitted, and it is determined in step S134 that the vehicle 10 is not stopped, the processing returns to step S132.

In step S142, the vehicle data transmission unit 199 transmits the respective pieces of second vehicle data before and after the software update stored in the storage unit 198 to the analysis server 30 via the gateway ECU 12 (communication device 11). As a result, the analysis server 30 (effect evaluation unit 304) can acquire (receive) the second vehicle data before and after the software update, and evaluate the effect of the software update.

When the processing of step S142 is completed, the central ECU 19 ends this flowchart processing.

Thus, in this example, the central ECU 19 performs software update after completing acquisition of the second vehicle data.

This ensures that the central ECU 19 can acquire the second vehicle data before the software update. As a result, the software update system 1 can use the second vehicle data before and after the software update to reliably evaluate the effect of the software update.

Another Example of Software Update Processing

Figure 12:
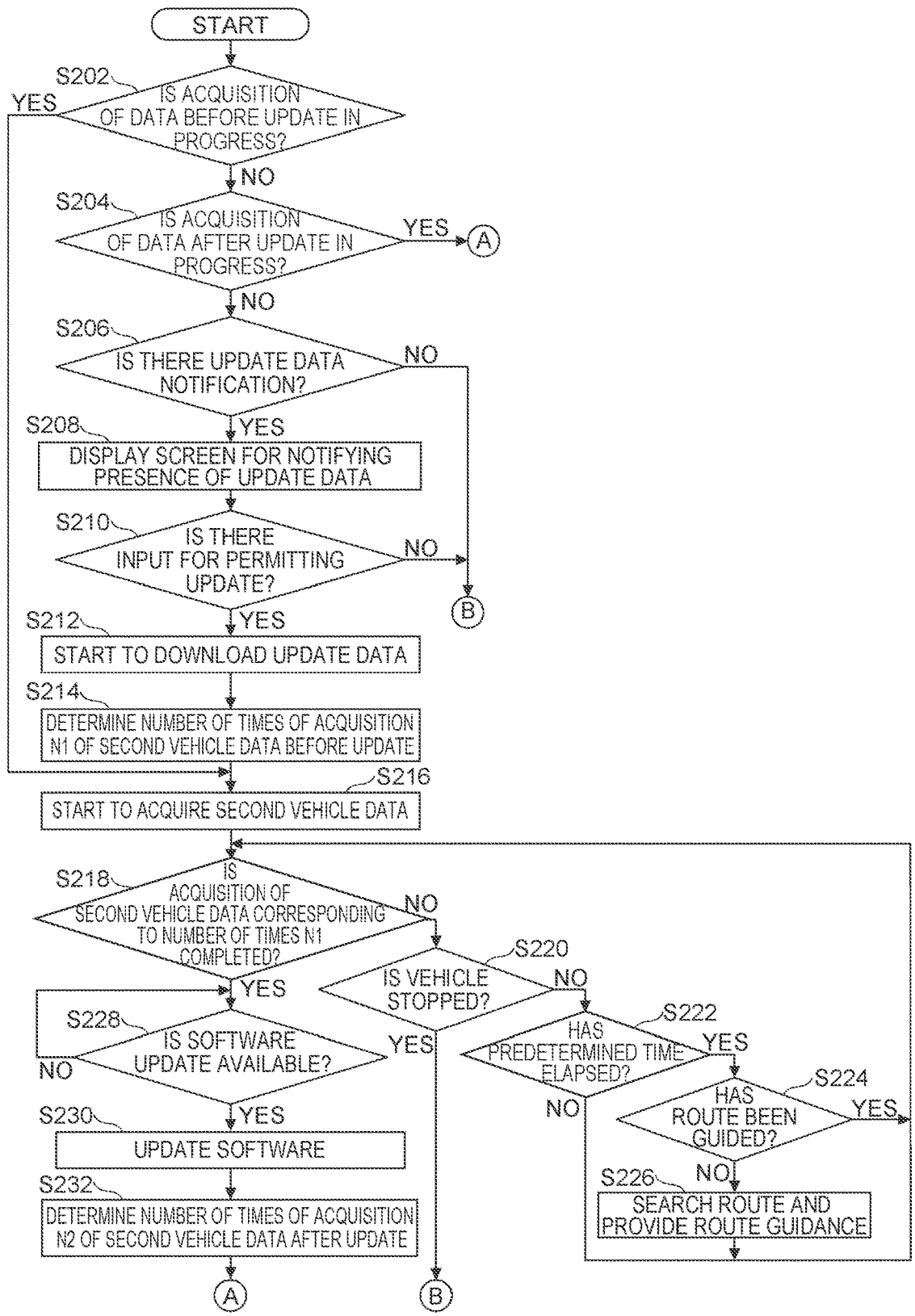
FIG. 12 is a flowchart schematically showing another example of the software update processing by the central ECU.
Figure 13:
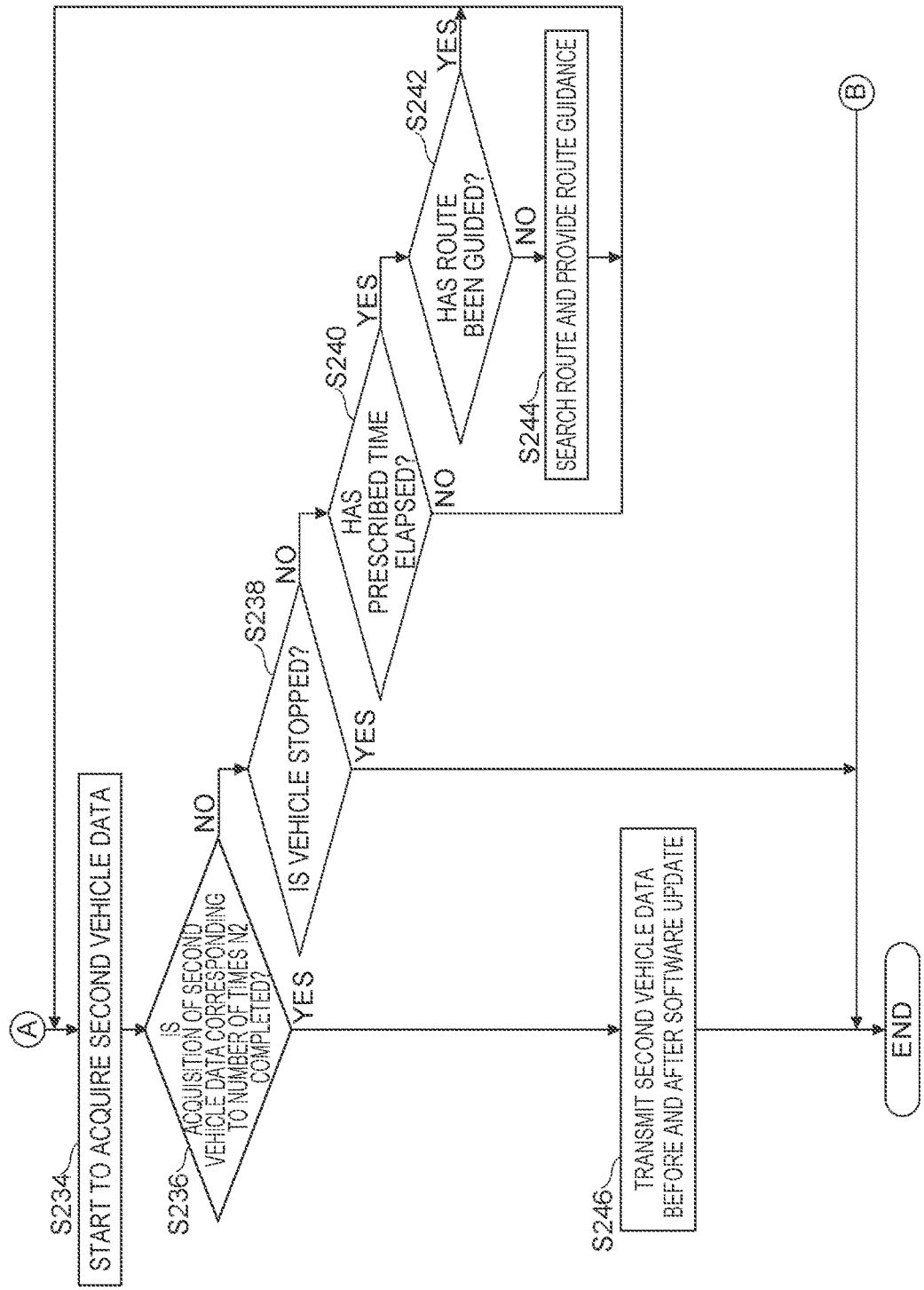
FIG. 13 is a flowchart schematically showing another example of the software update processing by the central ECU.

Description is now given of another example of the processing for updating software by the central ECU 19 with reference to FIGS. 12 and 13.

Since the processing of steps S202 to S212 is the same as steps S102 to S112 of FIG. 10, description thereof is omitted.

When the processing of step S212 is completed, the central ECU 19 proceeds to step S214.

In step S214, the vehicle data acquisition unit 196 determines the number of times of acquisition N1 (an integer of two or more) of the second vehicle data before the software update. For example, when the second vehicle data is acquired as time series data for a given period at the time when the acquisition condition is established as described before, the number of times of acquisition N1 corresponds to the number of pieces of the second vehicle data acquired as time series data for the given period. For example, when there are two or more acquisition conditions, the number of times of acquisition N1 corresponds to the number of times of acquisition of the second vehicle data for each of the acquisition conditions. The number of times of acquisition N1 may be fixed or variable.

For example, the number of times of acquisition N1 is variable depending on the type of software and the content of the update, for example. For example, depending on the type of software and the content of the update, the conditions for acquiring the second vehicle data (e.g., travel conditions and environmental conditions) may have a very narrow range, and therefore the probability of acquiring incorrect second vehicle data may increase. Therefore, in such cases, acquiring more pieces of second vehicle data under the same acquisition conditions can increase the probability of acquiring appropriate second vehicle data. For example, depending on the type of software and the content of the update, the second vehicle data of the type that is an acquisition target may vary relatively widely. Therefore, in such cases, acquiring more pieces of second vehicle data under the same acquisition conditions allows the analysis server 30 to statistically process a plurality of pieces of second vehicle data and to provide more accurate evaluation regarding the effect of the software update.

The number of times of acquisition N1 is also variable depending on, for example, the size of software update. The size of the software update is defined, for example, by the number of feature items of the vehicle 10 updated by the software update. The size of the software update may also be defined, for example, by the amount of data in the software update.

For example, as the number of feature items that change due to software update is larger, the manufacturer and developer of the vehicle 10 have relatively higher degree of interest to the effect of the software update. Moreover, for example, as the number of feature items of the vehicle 10 that change due to software update is larger, the number of lines of program source codes and the size of reference data become relatively larger. As a result, the data amount of update data becomes relatively large. For example, when the software update provides a large improvement of specific feature items of the vehicle 10, the number of lines of program source codes and the size of reference data become relatively larger because of a large modification of algorithms and the like. As a result, the data amount of the update data becomes relatively large. As the number of feature items of the vehicle 10 that change due to software update is relatively larger, or as an improvement margin of the specific feature items of the vehicle 10 becomes relatively larger, the manufacturer and developer of the vehicle 10 have relatively higher degree of interest to the effect of the software update. Therefore, the larger the size of the software update is, the more likely the manufacturer and developer of the vehicle 10 need more accurate evaluation results regarding the effect of the software update. Therefore, the number of times of acquisition N1 may be variable so as to be larger (more frequent) as the size of the software update is larger.

When the processing of step S214 is completed, the central ECU 19 proceeds to step S216.

Since the processing of step S216 is the same as step S114 of FIG. 10, description thereof is omitted.

When the processing of step S216 is completed, the central ECU 19 proceeds to step S218.

In step S218, the vehicle data acquisition unit 196 determines whether acquisition of the second vehicle data corresponding to the number of times of acquisition N1 is completed. When acquisition of the second vehicle data corresponding to the number of times of acquisition N1 is not completed, the vehicle data acquisition unit 196 proceeds to step S220. When the acquisition of the second vehicle data corresponding to the number of times of acquisition N1 is completed, the vehicle data acquisition unit 196 proceeds to step S228.

Since steps S220 to S230 are the same as the processing in steps S118 to S128 of FIG. 1, description thereof is omitted.

When the processing of step S230 is completed, the central ECU 19 proceeds to step S232.

In step S232, the vehicle data acquisition unit 196 determines the number of times of acquisition N2 of the second vehicle data after the software update. For example, when the second vehicle data is acquired as time series data for a given period at the time when the acquisition condition is established as described before, the number of times of acquisition N2 corresponds to the number of pieces of the second vehicle data acquired as time series data for the given period, similar to the number of times of acquisition N1. For example, when there are two or more acquisition conditions, the number of times of acquisition N2 corresponds to the number of times of acquisition of the second vehicle data for each of the acquisition conditions, similar to the number of times acquisition N1. The number of times of acquisition N2 may be fixed or variable as in the case of the number of times of acquisition N1. The number of times of acquisition N2 may be identical to or different from the number of times of acquisition N1.

For example, the number of times of acquisition N2 is variable depending on the type of software and the content of the update, as in the case of the number of times of acquisition N1.

The number of times of acquisition N2 is also variable depending on, for example, the size of software update as in the case of the number of times of acquisition N1. Specifically, the number of times of acquisition N2 may be variable so as to be larger (more frequent) as the size of the software update is larger. The number of times of acquisition N2 may also be identical to or different from the number of times of acquisition N1.

When the processing of step S232 is completed, the central ECU 19 proceeds to step S234.

As shown in FIG. 13, the processing of step S234 is the same as step S130 of FIG. 11, and therefore description thereof is omitted.

When the processing of step S234 is completed, the central ECU 19 proceeds to step S236.

In step S236, the vehicle data acquisition unit 196 determines whether acquisition of the second vehicle data corresponding to the number of times of acquisition N2 is completed. When acquisition of the second vehicle data corresponding to the number of times of acquisition N2 is not completed, the vehicle data acquisition unit 196 proceeds to step S238. When the acquisition of the second vehicle data corresponding to the number of times of acquisition N2 is completed, the vehicle data acquisition unit 196 proceeds to step S246.

Since steps S238 to S246 are the same as the processing in steps S134 to S142 of FIG. 11, description thereof is omitted.

When the processing of step S246 is completed, the central ECU 19 ends this flowchart processing.

Thus, in this example, the central ECU 19 performs software update after completing acquisition of the second vehicle data corresponding to the number of times of acquisition N1 that is two or more. The central ECU 19 also acquires the second vehicle data after software update corresponding to the number of times of acquisition N2 that is two or more.

This allows the central ECU 19 to acquire a plurality of pieces of second vehicle data before the software update and a plurality of pieces of second vehicle data after the software update. Therefore, the software update system 1 (analysis server 30) can evaluate the effect of the software update by, for example, removing inappropriate data from the acquired second vehicle data, or by statistically processing the acquired second vehicle data. This allows the software update system 1 to evaluate the effect of the software update more reliably with a higher accuracy.

Example of Processing to Evaluate Effect of Software Update

Figure 14:
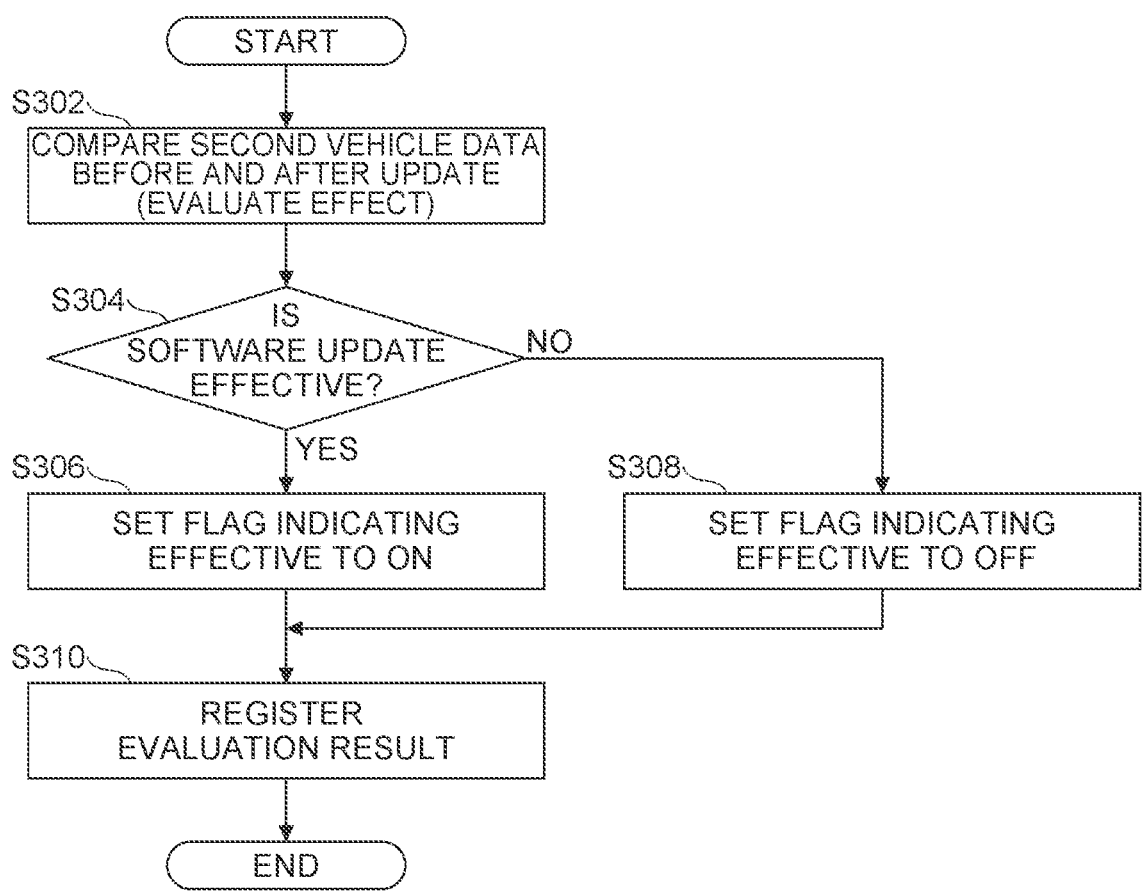
FIG. 14 is a flowchart schematically showing an example of effect evaluation processing by an analysis server.

Description is now given of an example of the processing to evaluate the effect of software update of the vehicle 10 by the analysis server 30 with reference to FIG. 14.

FIG. 14 is a flowchart schematically showing an example of the processing to evaluate the effect of software update of the vehicle 10 by the analysis server 30. This flowchart is executed, for example, when the second vehicle data before and after software update are received from the vehicle 10. The same may apply to the flowchart of FIG. 15 described later.

As shown in FIG. 14, in step S302, the effect evaluation unit 304 compares the second vehicle data before and after software update, which are uploaded from the vehicle 10, to evaluate the effect of the software update of the target vehicle 10.

For example, when there are one piece of second vehicle data before software update and one piece of second vehicle data after software update, the effect evaluation unit 304 directly compares these pieces of second vehicle data with each other to evaluate the effect of the software update of the vehicle 10. The effect evaluation unit 304 may also correct at least one piece of data out of the second vehicle data before and after the software update, and compare the corrected second vehicle data with each other to evaluate the effect of the software update of the vehicle 10. For example, at least one piece of the second vehicle data before the software update and the second vehicle data after the software update may be corrected in a predetermined method so as to eliminate any relative difference in condition such as travel conditions and environmental conditions at the time of acquisition, or any absolute difference relating to predetermined criterion for the condition such as travel conditions and environmental conditions at the time of acquisition. When there are a plurality of pieces of second vehicle data before the software update and a plurality of second vehicle data after software update (see FIGS. 12 and 13), the effect evaluation unit 304 may apply statistical processing to these pieces of second vehicle data to generate one piece of processed second vehicle data before the software update and one piece of processed second vehicle data after the software update, and compare these processed second vehicle data with each other to evaluate the effect of the software update. In this case, the effect evaluation unit 304 may also remove any inappropriate second vehicle data from these pieces of second vehicle data. The inappropriate second vehicle data, among these pieces of second vehicle data, includes, for example, vehicle data corresponding to abnormal values that exceed an expected range, and second vehicle data that does not satisfy the acquisition condition.

When step S302 is completed, the analysis server 30 proceeds to step S304.

In step S304, the effect evaluation unit 304 determines whether the evaluation indicating that the software update is effective is made in step S302.

For example, when the target of evaluation is the effect regarding enhancement (improvement) of the performance corresponding to the purpose of the software update, the effect evaluation unit 304 evaluates the presence or absence of the effect based on whether an index value as an evaluation result exceeds a predetermined criterion. For example, when the target of evaluation is the effect regarding whether the state of the vehicle 10 according to the content of the software update is implemented, the effect evaluation unit 304 evaluates that the software update is effective when the state of the vehicle 10 according to the content of the software update is implemented.

When the software update is effective, the effect evaluation unit 304 proceeds to step S306. When the software update is not effective, the effect evaluation unit 304 proceeds to step S308.

In step S306, the effect evaluation unit 304 sets a flag indicating that the software update is effective to "ON".

When step S306 is completed, the analysis server 30 proceeds to step S310.

In step S308, the effect evaluation unit 304 sets the flag indicating that the software update is effective to "OFF".

When the processing of step S308 is completed, the analysis server 30 proceeds to step S310.

In step S310, the effect evaluation unit 304 registers the data on the evaluation result about the effect of the software update of the target vehicle 10, including the data on the flag set in step S306 or step S308, in a predetermined storage unit defined in the auxiliary storage device or the like. In this case, the effect evaluation unit 304 registers the data about the evaluation result, in association with identification information on the target vehicle 10, in the predetermined storage unit. Accordingly, for example, the developer or service staff of the vehicle 10 can check the result of evaluation regarding the effect of the software update for each vehicle 10.

When the processing of step S310 is completed, the analysis server 30 ends this flowchart processing.

Thus, in this example, the analysis server 30 compares the second vehicle data before and after software update which are uploaded from the vehicle 10 to evaluate the effect of the software update of the target vehicle 10.

This allows the analysis server 30 to more easily (more efficiently) evaluate the effect of the software update of the vehicle 10.

Another Example of Processing to Evaluate Effect of Software Update

Figure 15:
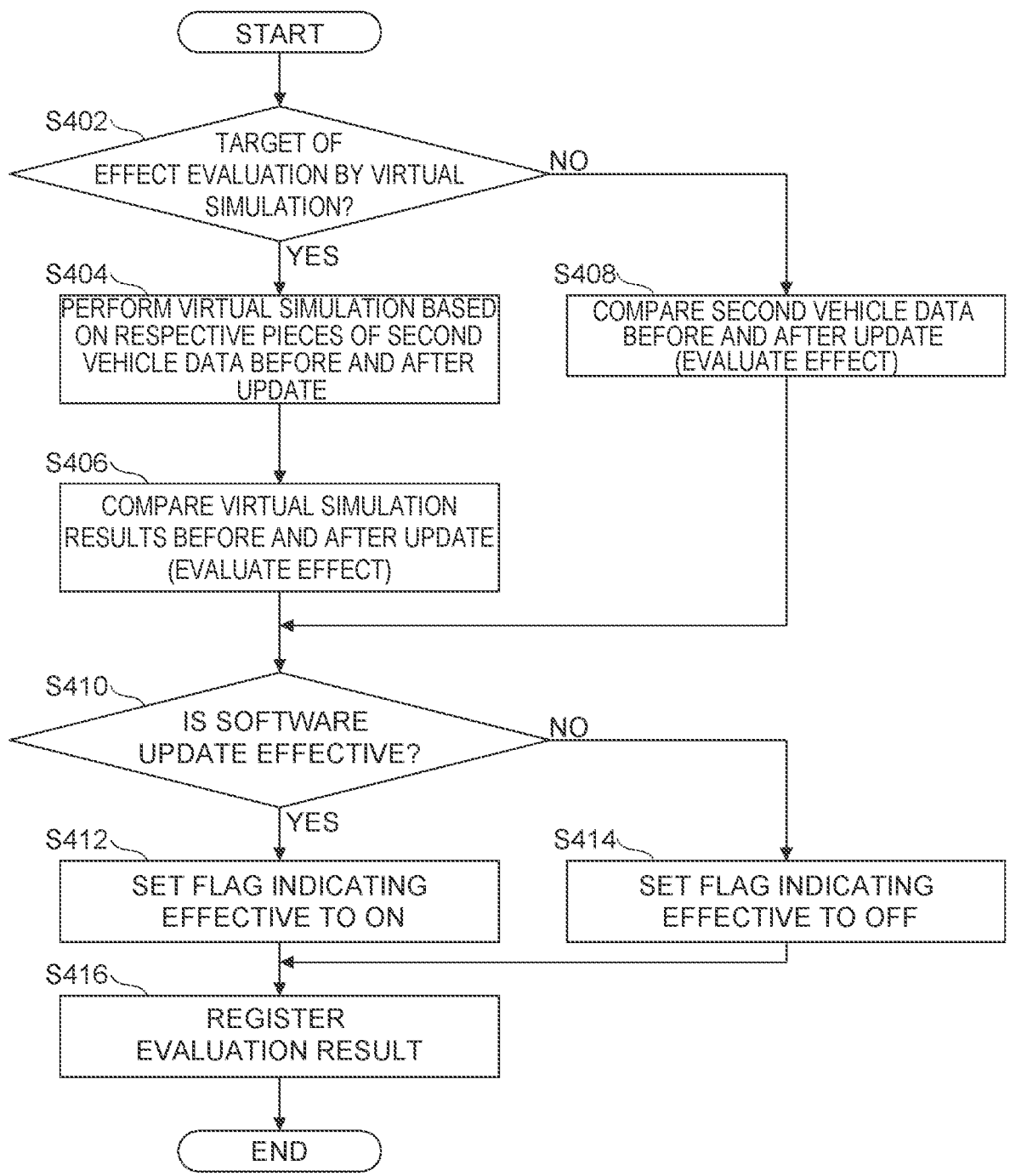
FIG. 15 is a flowchart schematically showing another example of the effect evaluation processing by the analysis server.

Description is now given of another example of the processing to evaluate the effect of software update of the vehicle 10 by the analysis server 30 with reference to FIG. 15.

FIG. 15 is a flowchart schematically showing another example of the processing to evaluate the effect of software update of the vehicle 10 by the analysis server 30.

As shown in FIG. 15, in step S402, the effect evaluation unit 304 determines whether the effect of this software update of the target vehicle 10 is the effect to be evaluated by the virtual simulation based on the virtual vehicle model of the vehicle 10.

For example, whether the effect of this software update of the target vehicle 10 is the effect to be evaluated by the virtual simulation based on the virtual vehicle model of the vehicle 10 is prescribed in advance for each piece of the update data, and is automatically determined according to the prescribed content. Moreover, whether the effect of this software update of the target vehicle 10 is the effect to be evaluated by the virtual simulation based on the virtual vehicle model of the vehicle 10 may be determined using table information or the like, based on the type of software, the content of the update, feature items of the vehicle 10 changed by the software update, and the like.

When the effect of this software update of the target vehicle 10 is the effect to be evaluated by the virtual simulation based on the virtual vehicle model of the vehicle 10, the effect evaluation unit 304 proceeds to step S404. Otherwise, the effect evaluation unit 304 proceeds to step S408.

In step S404, the effect evaluation unit 304 causes the simulator unit 303 to perform virtual simulation under the same conditions based on virtual vehicle models that reflect the respective pieces of second vehicle data before and after the software update of the target vehicle 10.

Once the processing of step S404 is completed and the virtual simulation by the simulator unit 303 is completed, the analysis server 30 proceeds to step S406.

In step S406, the effect evaluation unit 304 evaluates the effect of the software update of the vehicle 10 by comparing the results of the virtual simulation based on the respective virtual vehicle models corresponding to before and after the software update of the vehicle 10.

When the processing of step S406 is completed, the analysis server 30 proceeds to step S410.

Since the processing of step S408 is the same as step S302 of FIG. 14, description thereof is omitted.

When the processing of step S408 is completed, the analysis server 30 proceeds to step S410.

Since steps S410 to S416 are the same as the processing in steps S304 to S310 of FIG. 14, description thereof is omitted.

Thus, in this example, the analysis server 30 performs virtual simulation under the same conditions based on the respective pieces of second vehicle data before and after software update of the vehicle 10. The analysis server 30 then evaluates the effect of the software update of the vehicle 10 by comparing the respective results of the virtual simulation corresponding to before and after the software update of the vehicle 10.

Accordingly, since the analysis server 30 can compare the results of the virtual simulation under the same conditions, the analysis server 30 can evaluate the effect of the software update of the vehicle 10 with a higher accuracy.

In this example, the analysis server 30 also determines whether to perform evaluation of the effect by the virtual simulation, depending on the type of software, the content of the update, and the type of feature items of the vehicle 10 that change due to the software update.

This enables the analysis server 30 to balance the efficiency of evaluation and the accuracy of the evaluation, in matching with the effect to be evaluated.

Operation

Description is now given of the operation of the software update system 1 according to the present embodiment.

In the present embodiment, the software update system 1 updates software used in the vehicle 10 based on update data of the software, the update data being transmitted to the vehicle 10 from the distribution server 20 that is communicably connected to the vehicle 10. Specifically, the software update system 1 includes an update unit, an acquisition unit, and an evaluation unit. More specifically, the update unit (e.g., software update unit 194) updates the software of the vehicle 10 based on the update data. The acquisition unit (e.g., vehicle data acquisition unit 196) also acquires predetermined data (e.g., second vehicle data) regarding the respective states of the vehicle 10 before and after the software update of the vehicle 10 performed by the update unit. The evaluation unit (e.g., effect evaluation unit 304) evaluates the effect of the software update based on the respective pieces of predetermined data before and after the software update.

Accordingly, the software update system 1 can evaluate the effect of the vehicle 10 when the update of the software used in the vehicle 10 is actually performed.

In the present embodiment, the software update system 1 includes a determination unit. Specifically, the determination unit (e.g., vehicle data acquisition unit 196) may determine whether the acquisition unit has acquired predetermined data before the software update. The update unit then updates the software, when the determination unit determines that the predetermined data before the software update has been acquired.

This ensures that the software update system 1 can acquire the predetermined data regarding the state of the vehicle 10 before the software update. Therefore, the software update system 1 can evaluate the effect of the software update more reliably.

In the present embodiment, the determination unit may determine whether two or more first predetermined numbers (e.g., the number of times of acquisition N1) of pieces of the predetermined data before the software update have been acquired.

As a result, the software update system 1 can use a plurality of predetermined data regarding the state of the vehicle 10 before the software update. Therefore, the software update system 1 can evaluate the effect of the software update with a higher accuracy.

In the present embodiment, the first predetermined numbers may also be variable depending on at least one of the content and the size of the software update of the vehicle 10.

Accordingly, the software update system 1 can enhance the efficiency of data acquisition by reducing the number of pieces of the predetermined data to be acquired, or enhance the accuracy of evaluation regarding the effect of the software update by increasing the number of pieces of the predetermined data to be acquired, in matching with the content and the size of the software update. Accordingly, the software update system 1 can balance the enhanced efficiency in data acquisition and the enhanced accuracy in evaluation regarding the effect of the software update in matching with the content and the size of the software update.

In the present embodiment, the software update system 1 may include a guide unit. Specifically, the guide unit (e.g., route guidance unit 197) guides a travel route for acquiring the predetermined data after the software update for the driver of the vehicle 10, after the software update by the update unit.

As a result, the software update system 1 can direct the vehicle 10 to a route that meets travel conditions and environmental conditions for acquiring predetermined data required to evaluate the effect of the software update, for example. The software update system 1 can also direct the vehicle 10 to the route same as the route used when the predetermined data before software update is acquired, for example. Therefore, the software update system 1 can acquire the predetermined data regarding the state of the vehicle 10 after software update in a more proper manner. As a result, the software update system 1 can evaluate the effect of the software update with a higher accuracy.

In the present embodiment, the acquisition unit may acquire two or more second predetermined numbers (e.g., the number of times of acquisition N2) of pieces of the predetermined data after the software update.

As a result, the software update system 1 can use a plurality of pieces of predetermined data regarding the state of the vehicle 10 after the software update. Therefore, the software update system 1 can evaluate the effect of the software update with a higher accuracy.

In the present embodiment, the second predetermined numbers may also be variable depending on at least one of the content and the size of the software update of the vehicle 10.

Accordingly, the software update system 1 can enhance the efficiency of data acquisition by reducing the number of pieces of the predetermined data to be acquired, or enhance the accuracy of evaluation regarding the effect of the software update by increasing the number of pieces of the predetermined data to be acquired, in matching with the content and the size of the software update. Accordingly, the software update system 1 can balance the enhanced efficiency in data acquisition and the enhanced accuracy in evaluation regarding the effect of the software update in matching with the content and the size of the software update.

In the present embodiment, the evaluation unit may also compare the predetermined data before and after the software update of the vehicle 10 to evaluate the effect of the software update.

As a result, the software update system 1 can evaluate the effect of the software update.

In the present embodiment, the evaluation unit may evaluate the effect by performing virtual simulation using a virtual model corresponding to the vehicle 10, based on the respective pieces of predetermined data before and after the software update, and comparing the results of the simulation.

Consequently, the software update system 1 can evaluate the effect of the software update with a higher accuracy.

In the present embodiment, the evaluation unit may determine whether to perform virtual simulation in evaluation of the effect of the software update of the vehicle 10, in accordance with the content of the software update.

As a result, the software update system 1 can enhance the efficiently in evaluation without performing virtual simulation, or achieve evaluation with a higher accuracy by performing the virtual simulation, in matching with the content of the software update. Accordingly, the software update system 1 can balance the enhanced evaluation efficiency and the enhanced evaluation accuracy in matching with the content of the software update.

In the present embodiment, the evaluation unit may change the travel condition of the vehicle 10 during the virtual simulation in accordance with the content of the software update.

This allows the software update system 1 to perform the virtual simulation in matching with the travel condition that is influenced by the software update. Therefore, the software update system 1 can evaluate the effect of the software update with a higher accuracy.

In the present embodiment, the evaluation unit may compare change in features of the vehicle 10 as a result of comparing the respective pieces of predetermined data before and after the software update and change in features of the vehicle 10 as a result of comparing the results of the virtual simulation corresponding to the respective pieces of predetermined data before and after the software update.

This allows the software update system 1 to evaluate the effect of the software update by using both the result of comparing between the predetermined pieces of data on the actual vehicle 10 and the result of comparing the results of the virtual simulation. Therefore, the software update system 1 can evaluate the effect of the software update with a higher accuracy.

In the present embodiment, the virtual vehicle model may also be a general-purpose model corresponding to the vehicle 10.

As a result, the software update system 1 can predict the effect of software update by using, for example, a virtual vehicle model (general-purpose model) common to the vehicles 10 identical in vehicle type. Therefore, the software update system 1 can reduce the effort and time required to prepare the virtual vehicle model for evaluating the effect of the software update, and more efficiently evaluate the effect of the software update, for example.

In the present embodiment, the virtual vehicle model may also be a dedicated model corresponding to the vehicle 10.

As a result, the software update system 1 can evaluate the effect of the software update by using the virtual vehicle model dedicated to each of the vehicles 10. Therefore, the software update system 1 can reflect the unique circumstances of the individual vehicles 10 upon the effect of the software update, and as a result, can evaluate the effect of the software update with a higher accurately.

In the present embodiment, the software update system 1 may also include a generation unit that generates the virtual vehicle model. Specifically, the generation unit (e.g., virtual vehicle model acquisition unit 301) may update the virtual vehicle model in matching with at least one of secular change of the vehicle 10, use condition of the vehicle 10, and change in component members of the vehicle 10.

Accordingly, the software update system 1 can reflect the specific unique circumstances of the vehicle 10, such as the secular change of the vehicle 10, the use condition of the vehicle 10, and the change in component members of the vehicle 10, specifically upon the virtual vehicle model dedicated to the vehicle 10.

In the present embodiment, the generation unit may also acquire data (e.g., first vehicle data) representing an actual state of the vehicle 10, and generate and update a digital twin of the vehicle 10 as the virtual vehicle model.

As a result, the software update system 1 can evaluate the effect of the software update by using the virtual vehicle model (digital twin) that constantly reflects the latest state of the vehicle 10. Therefore, the software update system 1 can evaluate the effect achieved by updating the software with a higher accuracy.

Although the embodiments have been described in detail, the present disclosure is not limited to such specific embodiments. Various modifications and changes may be possible without departing from the scope of the present disclosure as set forth by the appended claims.

What is claimed is:

1. An information processing system configured to update software used in a vehicle based on update data of the software, the update data being transmitted to the vehicle from an external device that is communicably connected to the vehicle, the information processing system comprising:
processing circuitry configured to:
acquire respective pieces of predetermined data about states of the vehicle before and after the software update;
determine whether the predetermined data before the software update has been acquired; and
update the software based on the update data, when it is determined that the predetermined data before the software update has been acquired;
search, after the software update, for a travel route suitable for acquiring the predetermined data after the software update;
guide, after the software update, the travel route for a driver of the vehicle;
evaluate an effect of the software update based on the respective pieces of predetermined data before and after the software update, wherein the effect of the software update is an effect relating to an improvement of a performance corresponding to a purpose of the software update, and wherein the performance is at least one of a motive power performance, an energy saving performance, or a speed of shift change of a transmission;
evaluate the effect by performing virtual simulation using a virtual model corresponding to the vehicle, based on the respective pieces of predetermined data before and after the software update, and comparing results of the virtual simulation; and
change a travel condition of the vehicle in the virtual simulation, in accordance with a content of the software update.

2. The information processing system according to claim 1, wherein the processing circuitry is further configured to determine whether two or more first predetermined numbers of pieces of the predetermined data before the software update have been acquired.

3. The information processing system according to claim 2, wherein the first predetermined numbers are variable depending on at least one of a content and a size of the software update.

4. The information processing system according to of claim 1, wherein the processing circuitry is further configured to acquire two or more second predetermined numbers of pieces of the predetermined data after the software update.

5. The information processing system according to claim 4, wherein the second predetermined numbers are variable depending on at least one of a content and a size of the software update.

6. The information processing system according to claim 1, wherein the processing circuitry is further configured to evaluate the effect by comparing the predetermined data before and after the software update.

7. The information processing system according to claim 1, wherein the processing circuitry is further configured to determine whether to perform the virtual simulation in evaluation of the effect, in accordance with a content of the software update.

8. The information processing system according to claim 1, wherein the processing circuitry is further configured to evaluate the effect by comparing change in features of the vehicle as a result of comparing the predetermined data before and after the software update and change in features of the vehicle as a result of comparing the results of the virtual simulation based on the respective pieces of predetermined data before and after the software update.

9. The information processing system according to claim 1, wherein the virtual model is a general-purpose model corresponding to the vehicle.

10. The information processing system according to claim 1, wherein the virtual model is a dedicated model corresponding to the vehicle.

11. The information processing system according to claim 10, wherein the processing circuitry is further configured to:
generate the virtual model; and
update the virtual model in matching with at least one of secular change of the vehicle, use condition of the vehicle, and change in component members of the vehicle.

12. The information processing system according to claim 11, wherein the processing circuitry is further configured to:
acquire data representing an actual state of the vehicle; and
generate and update a digital twin of the vehicle as the virtual model.

13. An information processing device configured to update software used in a vehicle based on update data of the software, the update data being transmitted to the vehicle from an external device that is communicably connected to the vehicle, the information processing device comprising:
processing circuitry configured to:
acquire respective pieces of predetermined data about states of the vehicle before and after the software update;
determine whether the predetermined data before the software update has been acquired; and
update the software based on the update data, when it is determined that the predetermined data before the software update has been acquired;
search, after the software update, for a travel route suitable for acquiring the predetermined data after the software update;
guide, after the software update, the travel route for a driver of the vehicle;
evaluate an effect of the software update based on the respective pieces of predetermined data before and after the software update, wherein the effect of the software update is an effect relating to an improvement of a performance corresponding to a purpose of the software update, and wherein the performance is at least one of a motive power performance, an energy saving performance, or a speed of shift change of a transmission;
evaluate the effect by performing virtual simulation using a virtual model corresponding to the vehicle, based on the respective pieces of predetermined data before and after the software update, and comparing results of the virtual simulation; and change a travel condition of the vehicle in the virtual simulation, in accordance with a content of the software update.

14. An information processing method executed by an information processing device configured to update software used in a vehicle based on update data of the software, the update data being transmitted to the vehicle from an external device that is communicably connected to the vehicle, the information processing method comprising:

acquiring respective pieces of predetermined data about states of the vehicle before and after the software update;

determining whether the predetermined data before the software update has been acquired; and updating the software based on the update data, when it is determined that the predetermined data before the software update has been acquired;

searching, after the software update, for a travel route suitable for acquiring the predetermined data after the software update;

guiding, after the software update, the travel route for a driver of the vehicle;

evaluating an effect of the software update based on the respective pieces of predetermined data before and after the software update, wherein the effect of the software update is an effect relating to an improvement of a performance corresponding to a purpose of the software update, and wherein the performance is at least one of a motive power performance, an energy saving performance, or a speed of shift change of a transmission;

evaluating the effect by performing virtual simulation using a virtual model corresponding to the vehicle, based on the respective pieces of predetermined data before and after the software update, and comparing results of the virtual simulation; and changing a travel condition of the vehicle in the virtual simulation, in accordance with a content of the software update.

15. A non-transitory computer-readable storage medium storing instructions for causing an information processing device to execute steps, the information processing device configured to update software used in a vehicle based on update data of the software, the update data being transmitted to the vehicle from an external device that is communicably connected to the vehicle, the steps comprising:

acquiring respective pieces of predetermined data about states of the vehicle before and after the software update;

determining whether the predetermined data before the software update has been acquired; and updating the software based on the update data, when it is determined that the predetermined data before the software update has been acquired;

searching, after the software update, for a travel route suitable for acquiring the predetermined data after the software update;

guiding, after the software update, the travel route for a driver of the vehicle;

evaluating an effect of the software update based on the respective pieces of predetermined data before and after the software update, wherein the effect of the software update is an effect relating to an improvement of a performance corresponding to a purpose of the software update, and wherein the performance is at least one of a motive power performance, an energy saving performance, or a speed of shift change of a transmission;

evaluating the effect by performing virtual simulation using a virtual model corresponding to the vehicle, based on the respective pieces of predetermined data before and after the software update, and comparing results of the virtual simulation; and changing a travel condition of the vehicle in the virtual simulation, in accordance with a content of the software update.

* * * * *